United States Patent [19]

Narusawa

[11] Patent Number: 4,947,264
[45] Date of Patent: Aug. 7, 1990

[54] SYNCHRONIZING CIRCUIT FOR A VIDEO DISC PLAYBACK DEVICE

[75] Inventor: Sadayuki Narusawa, Hamamatsu, Japan

[73] Assignee: Yamaha Corporation, Shizuoka, Japan

[21] Appl. No.: 388,726

[22] Filed: Aug. 1, 1989

Related U.S. Application Data

[63] Continuation of Ser. No. 915,071, Oct. 3, 1986, abandoned.

[30] Foreign Application Priority Data

Oct. 7, 1985 [JP] Japan ................. 60-221784
Oct. 7, 1985 [JP] Japan ................. 60-221788
May 2, 1986 [JP] Japan ................. 61-102653
Jun. 6, 1986 [JP] Japan ................. 61-131156

[51] Int. Cl.$^5$ ................ H04N 5/76; H04N 5/95
[52] U.S. Cl. .................... 358/337; 358/326; 358/342; 358/183; 369/50
[58] Field of Search .............. 358/310, 319-322, 358/324, 326, 335, 337, 339, 342, 22, 148-149, 166, 181-183; 360/33.1, 36.1, 37.1, 73.01, 73.03; 369/47, 50

[56] References Cited

U.S. PATENT DOCUMENTS

| | | |
|---|---|---|
| 2,960,568 | 11/1960 | Leyton . |
| 3,499,974 | 3/1970 | Watanabe et al. ............. 358/319 |
| 4,165,524 | 8/1979 | Ninomiya . |
| 4,313,136 | 1/1982 | Kimura ................... 360/37.1 X |
| 4,467,371 | 8/1984 | Kobayashi et al. ......... 358/335 X |
| 4,477,841 | 10/1984 | Chen et al. .............. 358/335 |
| 4,486,892 | 12/1984 | Karijuku . |
| 4,498,103 | 2/1985 | Aschwanden ............. 358/319 X |
| 4,568,976 | 2/1986 | Trammell ............... 358/182 X |
| 4,577,229 | 3/1986 | de la Cierva, Sr. et al. ... 358/181 X |
| 4,577,236 | 3/1986 | Takanashi ............... 358/320 |
| 4,590,510 | 5/1986 | Jensen et al. ............ 358/320 X |
| 4,603,411 | 7/1986 | Sugiyama et al. ......... 369/47 |
| 4,620,300 | 10/1986 | Ogawa .................. 369/47 X |
| 4,642,676 | 2/1987 | Weinger ................. 358/166 X |
| 4,644,401 | 2/1987 | Gaskins ................. 358/22 X |

FOREIGN PATENT DOCUMENTS

3431946 3/1985 Fed. Rep. of Germany .
1556611 3/1968 France .
2124056 2/1984 United Kingdom .

Primary Examiner—Alan Faber
Assistant Examiner—W. R. Young
Attorney, Agent, or Firm—Spensley, Horn, Jubas & Lubitz

[57] ABSTRACT

A synchronizing circuit for a video disc playback device comprises a external signal processing system processing a video signal reproduced from a disc, a internal signal processing system processing an internal video signal to be superimposed on the video signal reproduced from the disc, a window establishing circuit for establishing a window including an expected timing of a synchronizing signal of the external signal processing system and a control circuit for controlling the internal signal processing system to synchronize with the external signal processing system. If a synchronizing signal from the external signal processing system has occurred in the window in the internal signal processing system, the expected timing of the synchronizing signal of the external signal processing system is used as the synchronizing signal of the internal signal processing system even if the actual synchronizing signal of the external signal processing system is deviated from the expected timing. The synchronizing circuit may further comprise a circuit for correcting the window when the synchronizing signal of the external signal processing system has occurred outside of the window. The synchronizing circuit may further comprise a time base correcting circuit for correcting time base of the reproduced video signal each time track-kick is performed and a time base reference changing circuit for compulsorily changing time base reference of the synchronizing system each time the track-kick is performed.

5 Claims, 13 Drawing Sheets o --- FIRST FIELD
x --- SECOND FIELD

SYNCHRONIZING CIRCUIT FOR A VIDEO DISC PLAYBACK DEVICE

This is a continuation of copending application Ser. No. 915,071 filed on Oct. 3, 1986, now abandoned.

BACKGROUND OF THE INVENTION

This invention relates to a synchronizing circuit for a video disc playback device and, more particularly, to a synchronizing circuit for a video disc playback device which, in performing superimpose such as display of a picture number, is capable of preventing amplification, in a system for producing an internal video signal such as a picture number on the video disc playback device, of distortion on time base in a video signal reproduced from a disc.

In superimposing an internal video signal such as a picture number (hereinafter sometimes referred to as "internal signal") which is produced in a system inside of the video disc playback device (hereinafter sometimes referred to as "internal signal processing system") upon a video signal reproduced from a disc (hereinafter sometimes referred to as "external signal") of a system processing such external signal (hereinafter sometimes referred to as "external signal processing system"), failure in synchronization between the external signal and the internal signal will cause a trouble such as a distortion in a reproduced picture. For preventing such trouble, a synchronizing signal contained in the external video signal is detected and the internal signal is superimposed on the external signal at a timing of the detected synchronizing signal.

In performing production of an internal video signal in digital processing, quantization (digitalization) of time base is required. Since an external signal from a disc contains jitter (distortion on time base), such jitter is amplified in the quantization process to produce an error equivalent to one clock with a result that distortion tends to be produced in a character of an internal signal displayed on a television.

FIG. 2 schematically shows a structure for providing a superimpose function to a conventional video disc playback device.

A reproduced signal from a disc 12 detected by an optical pickup head 10 (in this signal, jitter component has been removed to some extent by a tangential servo performed in the optical pickup head 10) is demodulated to a composite video signal by an FM detection circuit 14 and thereafter a synchronizing signal is separated from the composite video signal by a synchronizing signal separation circuit 16. For digitalizing the separated synchronizing signal, the separated synchronizing signal is applied to a register 18 which is driven by two phase clocks $\phi_1$ and $\phi_2$ in which it is quantized on time base. The digitalized synchronizing signal is then applied to a vertical and horizontal synchronizing signal detection circuit 20 in which a vertical synchronizing signal VSYNC and a horizontal synchronizing signal HSYNC are extracted from the synchronizing signal. For controlling rotation of a disc motor 24, a motor control circuit 22 performs a relatively rough control by comparing in phase a rotation detection pulse from a frequency generator 26 directly coupled to the disc motor 24 with a reference clock $\phi_{hl}$ produced from a crystal oscillator output and also performs a relatively accurate control by comparing in phase the extracted vertical synchronizing signal VSYNC or horizontal synchronizing signal HSYNC with a reference clock $\phi_{h2}$ produced from a crystal oscillator output.

A TBC (time base corrector) 25 is a circuit provided for absorbing a minute jitter remaining in the composite video signal and is constructed of an analog circuit such as a variable delay line. A TBC control circuit 27 extracts a color burst signal from an output signal of the TBC 25 and compares in phase the extracted color burst signal with a reference clock $\phi_c$ produced from a crystal oscillator output of 3.58 MHz corresponding to a subcarrier of the color burst and variably controls the delay time of the TBC 25 in accordance with a phase difference between the two signals thereby causing the TBC 25 to absorb the minute jitter in the external signal.

The external signal provided by the TBC 25 is delivered out from a synthesizing circuit 28.

A character production circuit 30 stores an internal signal to be superimposed on the external signal and provides this internal signal at a timing synchronized with the external signal in response to the vertical synchronizing signal VSYNC and the horizontal synchronizing signal HSYNC. The read-out internal signal is synthesized with the external signal by the synthesizing circuit 28 and thereafter is delivered out. In this manner, the character of the internal signal is superimposed on a predetermined position on the picture of the external signal.

The register 18 which connects the external signal processing system with the internal signal processing system and is driven by the two phase clocks $\phi_1$ and $\phi_2$ (clocks produced from crystal oscillation output and rising 455 times for example in one horizontal scanning period 1H) receives an input signal (horizontal synchronizing signal) at the clock $\phi_1$ and outputs it at the clock $\phi_2$, as shown in FIG. 3.

Accordingly, a quantization error occurs within one clock range of the clocks $\phi_1$ and $\phi_2$. In this case, if jitter of the input signal varies centered on ⓑ and within the extent of ⓐ and ⓒ as shown in FIG. 3, the point of change in the input signal exists between a fall point t1 of clock $\phi_1$ and a fall point t2 of a next clock $\phi_{1so}$ that the change in the input signal is loaded at clock $\phi_{1a}$ and delivered out at clock $\phi_{2a}$ and the output signal therefore becomes ⓓ in either case. In this case, therefore, jitter of the input signal is absorbed and the period of the output signal becomes 455 clocks length which is a normal period. If the central position of jitter is exactly halfway between t1 and t2, the jitter margin becomes equivalent to one clock of the clocks $\phi_1$ and $\phi_2$ (140 ns corresponding to half period of the subcarrier of the color burst) in peak-to-peak value.

The phase relation between the input signal and the clocks $\phi_1$ and $\phi_2$, however, is not centered on ⓑ as described above. If jitter varies centering on ⓐ or ⓒ, even a small jitter component in the input signal is amplified in the output signal with a result that one cycle of the output signal becomes 454 clocks (i.e., shortening) or 456 clocks (i.e., prolonging).

FIG. 4 shows a case in which the input signal has a very small jitter as shown in ⓐ and ⓑ. In the case of ⓐ, the input signal changes before falling of the clock $\phi_{la}$ so that this change is loaded at the clock $\phi_{la}$ and delivered out at the clock $\phi_{2a}$. In the case of ⓑ, the input signal changes after falling of the clock $\phi_{la}$, this change is loaded only at a next clock $\phi_{lb}$ and delivered out at the clock $\phi_{2b}$. Therefore, notwithstanding that the input signal contains only a very small jitter $\tau_i$, the jitter is amplified to $\tau_o$ in the output signal. This causes the period of the output signal to be varied by 1 clock from the reference 455 clock period to 454 clocks or 456 clocks.

As a result, if the internal signal is read out from the character production circuit 30 by using the horizontal synchronizing signal HSYNC detected in the internal signal processing system and combined with the external signal by the synthesizing circuit 28 as shown in FIG. 2, a slight distortion as shown by A in FIG. 5 in the external signal processing system which corresponds to jitter $\tau_j$ in the input signal is amplified in the internal signal processing system and displayed on the television, and in the case that the internal signal for displaying a vertical straight line is read out from the circuit 30, the line is distorted by one clock relative to the preceding scanning as shown by B in FIG. 5.

Besides, in a case where a main factor of the jitter component remaining is deviation of the disc center, jitter is inverted at each half rotation of the disc (i.e., every field), this causes distortion of one clock so that the vertical line of the picture, in interlaced scanning, is displayed on the television as meandering as shown in FIG. 6 changing its direction every scanning line and therefore distortion becomes conspicuous.

It is, therefore, a first object of the invention to provide a synchronizing circuit for a video disc playback device which, in superimposing an internal signal on an external signal, is capable of preventing amplification in a internal signal processing system of distortion on time base originally occurring in a external signal processing system.

As will be described more fully later, the first object of the invention is achieved by providing a circuit according to which a window is established in a internal signal processing system to include an expected timing of a synchronizing signal of a external signal processing system and, if the synchronizing signal from the external signal processing system has been detected in this window, the expected timing is assumed to be the timing of the synchronizing signal of the external signal processing system and the internal signal processing system is controlled on the basis of this assumption. In other words, if the synchronizing signal from the external signal processing system has been, detected in the window established in the internal signal processing system, the expected timing is used as the synchronizing signal in the internal signal processing system even if the time at which the synchronizing signal from the external signal processing system has occurred is deviated from the expected timing.

In the circuit according to the invention in which the window is established in the superimpose operation for preventing amplification of distortion on time base in the internal signal processing correction in the internal signal processing system is made only when the synchronizing signal from the external signal processing system has occurred outside of the window.

In the above described synchronizing circuit according to the invention, correction of window must be made in the internal signal processing system if a synchronizing signal of the external signal processing system has occurred outside of the window.

For effecting correction in the internal signal processing system in such a case, it is conceivable to correct the internal signal processing system in such a manner that, when the synchronizing signal has occurred outside of the window, an expected timing of a next synchronizing signal will come at the center of the window (i.e., shifting of the window position).

If the window is shifted in such a manner, however, the synchronizing signal is corrected excessively in a case where the synchronizing signal has occurred outside of the window but adjacent to it (This is particularly so if the window established has a large width.) and, accordingly, distortion on the television becomes conspicuous. Besides, since the window is corrected excessively, the synchronizing signal after correction occurs in an opposite portion of the window so that it is difficult to bring the window to the center of jitter with a result that the correcting operation in the internal signal processing system is performed too frequently thereby causing a periodic distortion in the picture.

It is, therefore, a second object of the invention to provide a synchronizing circuit in a video disc playback device capable of correcting the internal signal processing system with only a small amount of correction when the synchronizing signal of the external signal processing system has occurred adjacently outside of the window whereby distortion in the picture due to the correction is held at a minimum and the window can be readily brought to the center of jitter.

Functions of a video disc playback device include ones of a still picture and a trick play. The still picture function is one for repetitively reproducing data on a single track. The trick play includes, e.g., a forward or rearward shifting of a picture. These functions can be realized by kicking (i.e., performing a track jump) laser beam of the optical pickup head to a preceding or succeeding track.

In the conventional video disc playback device, there has been the problem that track-kick causes color inversion or color tone error in a reproduced picture from the disc for a single scanning line. This problem is caused by the fact that, in a CAV (constant angular velocity) disc of the NTSC system, color bursts of mutually adjacent tracks are different by half cycle (180 degrees) from each other.

Let us assume, for example, a case in which trackkick has been performed halfway in a certain horizontal scanning period as shown in FIG. 14. In a period of time designated by reference character ①, the color of the picture is produced on a television receiver side on the basis of color burst A of a preceding track and, accordingly, the color of the picture is inverted. Upon shifting to a next scanning line, the reference subcarrier on the television receiver side is reestablished by color burst B and the color inversion is corrected by this re-establishment in a period of time designated by reference character ②, for the color burst B is different in phase from the color burst A by 180 degrees. Since, however, this re-establishment involves a relatively large change in phase of 180 degrees, it takes some time before this reestablishment is completed and error is likely to occur in the reference subcarrier in an initial stage resulting in error in color tone.

This problem can be solved by correcting time base of the reproduced video signal from the disc each time track-kick is made. More specifically, by advancing or delaying the reproduced video signal from the disc in phase by a predetermined angle, e.g., 180 degrees, of the color burst each time track-kick is made, the color of the reproduced video signal, e.g., in FIG. 14, is made on the basis of the color burst A in the period of time designated by ① so that no color inversion is produced. As the reproduced video signal is corrected on time base, the color burst B is also shifted in phase by 180 degrees and becomes continuous to the color burst A so that the re-establishment of the reference subcarrier becomes unnecessary. The likelihood of color tone error therefore can be eliminated.

In the synchronizing circuit achieving the above described first object of the invention, however, the following problem arises: In the synchronizing circuit in which the window is provided for preventing amplification in the internal signal processing system of distortion on time base of the external signal processing system, the correction of time base of the reproduced signal from the disc (i.e., an external signal of the external signal processing system) made when the track-kick is performed is totally ignored by the window and therefore is not transmitted to the internal signal processing system. Accordingly, in superimposing an internal signal on an external signal, even when the external signal processing system has really changed by one clock, the internal signal processing system does not follow such change but produces the internal signal to be superimposed on the assumption that the color burst occurs at the same timing as before. This internal signal has a phase error of 180 degrees as viewed from the real color burst with a result that the color of the superimposed character is inverted.

It is, therefore, a third object of the invention to provide a synchronizing circuit to eliminate the above described inconvenience encountered in absorbing the quantizing error by the provision of the window.

As a function of a video disc playback device, it will be convenient if explanation about functions and manner of handling of the playback device or data for demonstration in a shop can be displayed when a disc is not played back.

This function and the above described superimpose function can be performed by reproducing internal video signals from a character generator provided in a video disc playback device. In superimposing an internal video signal on an external video signal or in switching a play mode from reproduction of the internal video signal to the external video signal or vice versa, synchronization between the internal video signal and the external video signal is required. Synchronization of the internal video signal is realized by a clock produced from a crystal oscillator output which is produced inside the disc playback device (i.e., the internal video signal can be displayed even when a disc has stopped) whereas synchronization of the external video signal reproduced from the disc is realized by a synchronizing signal contained in the video signal. Accordingly, synchronization of the internal video signal and that of the external video signal are performed independently from each other. If, however, horizontal and vertical synchronizing signals of the two systems are not synchronized in phase with each other, a character of the internal video signal cannot be displayed on a desired position on the picture. Further, in switching the play mode from the internal video signal to the external video signal or vice versa, flicker in the picture will take place.

It is, therefore, a fourth object of the invention to provide a synchronizing circuit capable of smoothly matching synchronization of the internal video signal with synchronization of the external video signal and thereby preventing disturbances in a picture in switching of the play mode or in performing superimpose.

SUMMARY OF THE INVENTION

The above described first object of the invention is achieved by a synchronizing circuit for a video disc playback device comprising a external signal processing system processing a video signal reproduced from a disc, a internal signal processing system processing an internal video signal to be superimposed on the video signal reproduced from the disc, window establishing means for establishing a window including an expected timing of a synchronizing signal of the external signal processing system and. control means for controlling the internal signal processing system to synchronize with the external signal processing system on the assumption that the expected timing is the timing of the synchronizing signal of the external signal processing system if the synchronizing signal of the external signal processing system has occurred in the window.

According to this feature, if a synchronizing signal from the external signal processing system has occurred in the window in the internal signal processing system, the expected timing of the synchronizing signal of the external signal processing system is used as the synchronizing signal of the internal signal processing system even if the actual synchronizing signal of the external signal processing system is deviated from the expected timing so that amplification in the internal signal processing system of distortion on time base of the external signal processing system can be prevented.

The second object of the invention is achieved by a synchronizing circuit further comprising means for correcting the window when the synchronizing signal of the external signal processing system has occured outside of the window within a predetermined length of time so that the window is shifted in a direction to include the timing of the synchronizing signal.

According to this feature, the amount of correction is reduced and distortion in the reproduced picture becomes inconspicuous as compared with the case where the internal signal processing system is corrected so that the expected timing of the synchronizing signal comes at the center of the window. Further, the window can be corrected so that the window comes at the center of jitter and therefore necessity for too frequent correcting operations can be eliminated.

The third object of the invention is achieved by compulsorily changing a time base reference of the internal signal processing system for example by 180 degrees each time the track-kick is made. And, there is provided a synchronizing circuit which further comprises time base correcting means for correcting time base of the reproduced video signal of the external signal processing system each time track-kick is performed and time base reference changing means for compulsorily changing time base reference of the internal signal processing system each time the track-kick is performed.

According to this feature, inversion of color in the internal signal superimposed on the external signal which otherwise is caused in the rounding of the external signal by the window can be effectively prevented so that still picture and trick play can be enjoyed without unpleasant color disturbances.

The fourth object of the invention is achieved by a synchronizing circuit for a video disc playback device comprising an internal video signal generation circuit for generating an internal video signal provided from the side of the video disc playback device, a synchronizing signal detection circuit for detecting a synchronizing signal in an external video signal reproduced from a video disc, a synchronizing error detection circuit for detecting a synchronizing error between a synchronizing signal of the internal video signal and the synchronizing signal of the external video signal, and a control circuit for gradually changing a timing of the synchronizing signal of the internal video signal in a direction to cause the synchronizing signal of the internal character signal to approach the synchronizing signal of the external video signal in accordance with the detected synchronizing error thereby to substantially match the two synchronizing signals with each other.

According to the invention, synchronization of the internal video signal (internal synchronization) is caused to gradually approach synchronization of the external video signal (external synchronization) whereby disturbances in a picture in switching the play mode or performing superimpose can be prevented. Since the internal synchronization approaches the external synchronization gradually and not abruptly, disturbance in the picture caused by changing of the internal synchronization per se can be prevented owing to a synchronization change absorbing correcting action performed on the side of the television.

BRIEF DESCRIPTION OF THE DRAWINGS

In the accompanying drawings,

FIGS. 3 and 4 (a) and (b) showing quantizing error in transferring a reproduced signal from a disc of the non-synchronizing system to the synchronizing system in which FIG. 3 shows a state in which jitter is absorbed and FIG. 4 shows a state in which jitter is amplified;

FIGS. 8 and 9 are diagrams showing a rounding operation performed in the circuit of FIG. 1 in which FIG. 8 shows a case where the window width is three clocks and FIG. 9 shows a case where the window width is five clocks;

DESCRIPTION OF PREFERRED EMBODIMENTS

Preferred embodiments of the invention will now be described with reference to the accompanying drawings.

Figure 7:
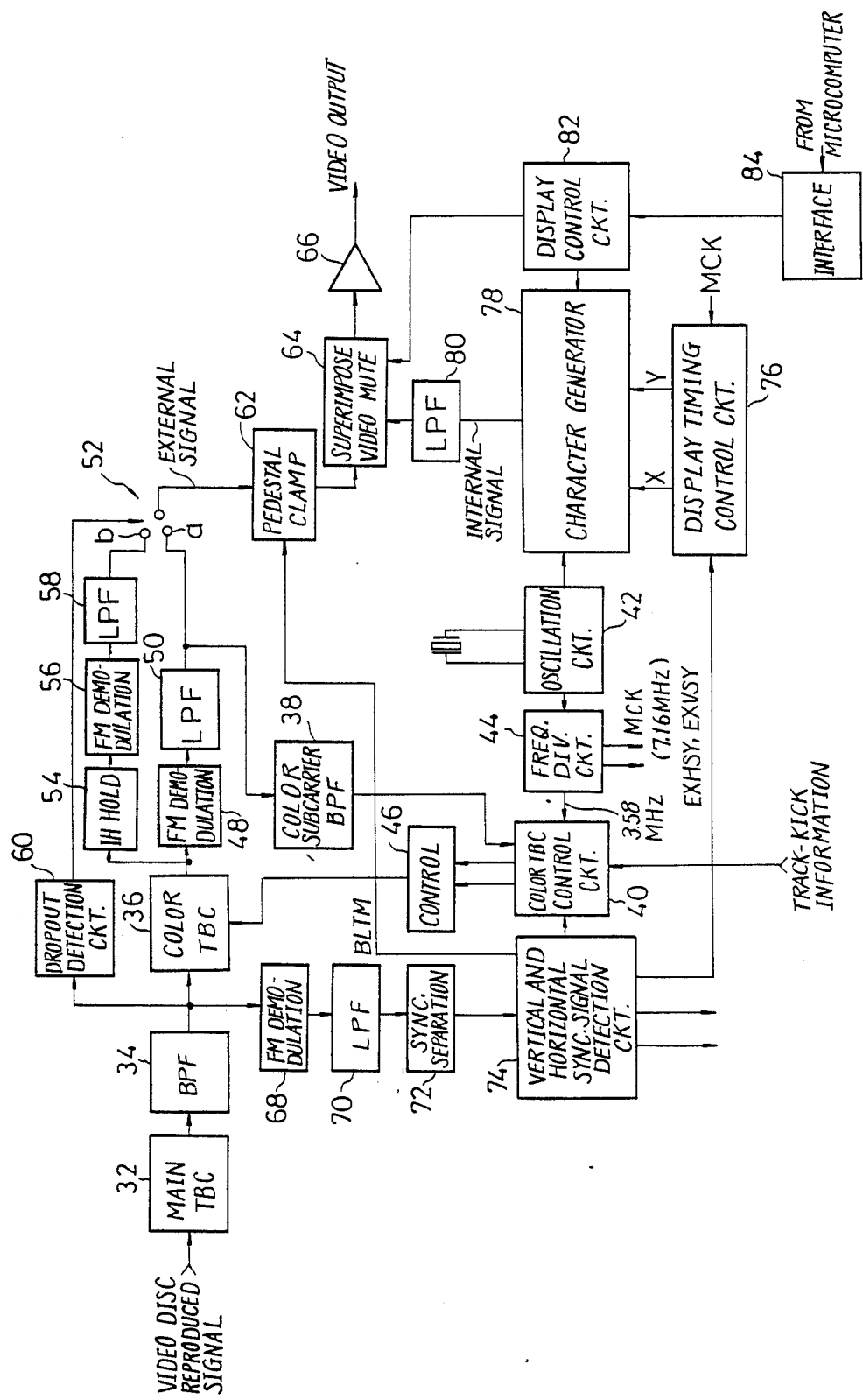
FIG. 7 is a block diagram showing an example of an overall construction of the video disc playback device to which the present, invention is applied.

FIG. 7 shows an overall construction of a signal processing system of a video disc playback device incorporating a synchronizing circuit according to the invention.

In FIG. 7, an external signal (i.e., a signal reproduced from a video disc) is applied to a main TBC 32. The main TBC 32 removes jitter (distortion in time base) contained in the external signal and consists of a successive variable delay circuit for a binary signal. For such variable delay circuit for a binary signal, a CMOS gate circuit described in the U.S. Pat. Application Ser. No. 760,332 filed on July 29, 1985, for example, may be used. The CMOS gate circuit consists of a P channel MOS-FET and an N channel MOS-FET and charge and discharge currents flow at inversion of its output owing to load capacity formed on the output side thereof thereby determining delay characteristics. The delay time of the CMOS gate circuit varies in accordance with power source voltage, since conductance of the elements vary. That is, the higher the power source voltage, the shorter is the delay time and vice versa. The successive variable delay circuit for the binary signal employing the CMOS gate circuit delays the binary signal utilizing these characteristics.

The main TBC 32 which is constructed with the CMOS gate circuit compares in phase a horizontal synchronizing signal in the external signal with a reference clock of a period corresponding to a normal horizontal synchronizing signal and controls power source voltage in accordance with a phase error between these signals thereby controlling the delay time and absorb jitter in the external signal.

A video signal component is extracted by a BPF (band-pass filter) 34 from the external signal provided by the main TBC 32.

A color TBC 36 is a circuit for removing minute jitter which has not been absorbed by the main TBC 32. The color TBC 36 is constructed with a successive variable delay circuit for a binary signal employing the CMOS gate circuit as in the main TBC. A color TBC control circuit 40 compares in phase a color burst extracted by a color subcarrier BPF 38 provided on the output side of the color TBC 36 with a reference clock of 3.58 MHz corresponding to a normal color subcarrier obtained by frequency-dividing an oscillation output of an oscillation circuit 42 by a frequency dividing circuit 44 and controls power source voltage in accordance with a phase error between these signals thereby controlling the delay time of the color TBC 36 through a control circuit 46 to absorb the minute jitter in the external signal.

The external signal provided from the color TBC 36 is FM-demodulated by an FM demodulation circuit 48 and transmitted to a contact a of a switch 52 through an LPF (low-pass filter) 50. For compensating a dropout, a 1H holding circuit 54 holds an external signal one scanning before and delivers it to a contact a of the switch 52 through an FM demodulation circuit 56 and an LPF 58. A dropout detection circuit 60 detects dropout in the external signal. The switch 52 is normally connected to the contact a and, when a dropout has occurred, is connected to the contact b during one horizontal scanning period 1H in response to the output of the dropout detection circuit 60. The external signal provided by the switch 52 is delivered out via a pedestal clamp circuit 62, a superimpose video mute circuit 64 and a video output amplifier 66.

The external signal from the BPF 34 is FM-demodulated by an FM demodulation circuit 68 and a synchronizing signal (external synchronizing signal) is separated by a synchronizing component separation circuit 72 through an LPF 70. A vertical and horizontal synchronizing signal detection circuit 74 detects a horizontal synchronizing signal EXHSY and a vertical synchronizing signal EXVSY from the separated external synchronizing signal.

A display timing control circuit 76 adjusts a timing of generation of the internal signal when the internal signal is to be superimposed on the external signal so as to synchronize the external signal with the internal signal. The display timing control circuit 76 reads out the internal signal stored in a character generator 78 in response to the detected external horizontal synchronizing signal EXHSY and external vertical synchronizing signal EXVSY. The readout internal signal is applied to a superimpose video mute circuit 64 through an LPF 80.

A display control circuit 82 controls the superimpose video mute circuit 64 and the character generator 78 based on a command provided by a microcomputer for operation control via an interface circuit 84. When there is no superimpose command, the character generator 78 is put to a non-operable state and the superimpose video mute circuit 64 is caused to deliver out the external signal. When there is a superimpose command, the character generator 78 is put to an operable state and a composite signal of the external signal and the internal signal is provided from the superimpose video mute circuit 64.

Figure 1:
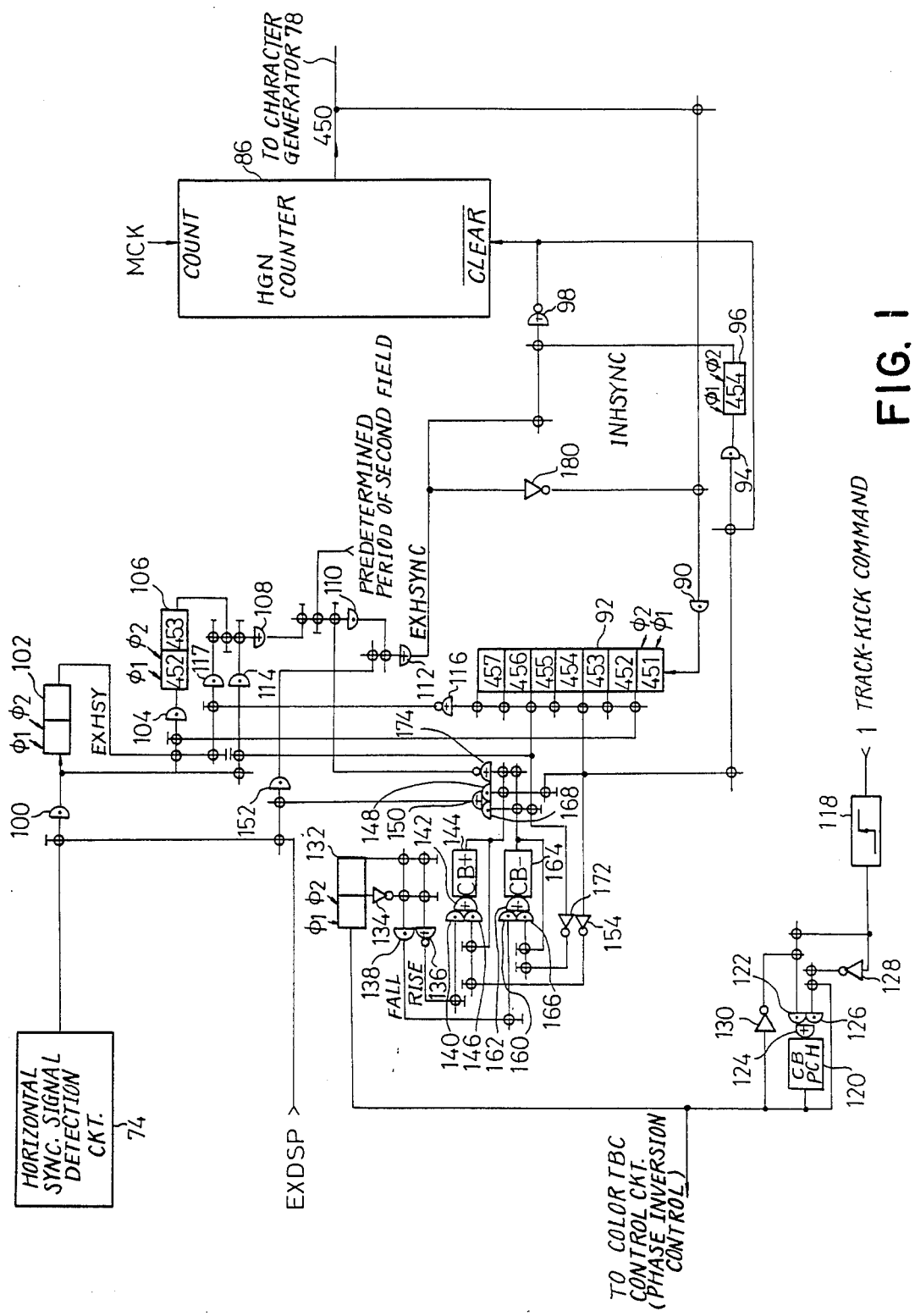
FIG. 1 is a circuit diagram showing an embodiment of the synchronizing circuit according to the invention.
Figure 2:
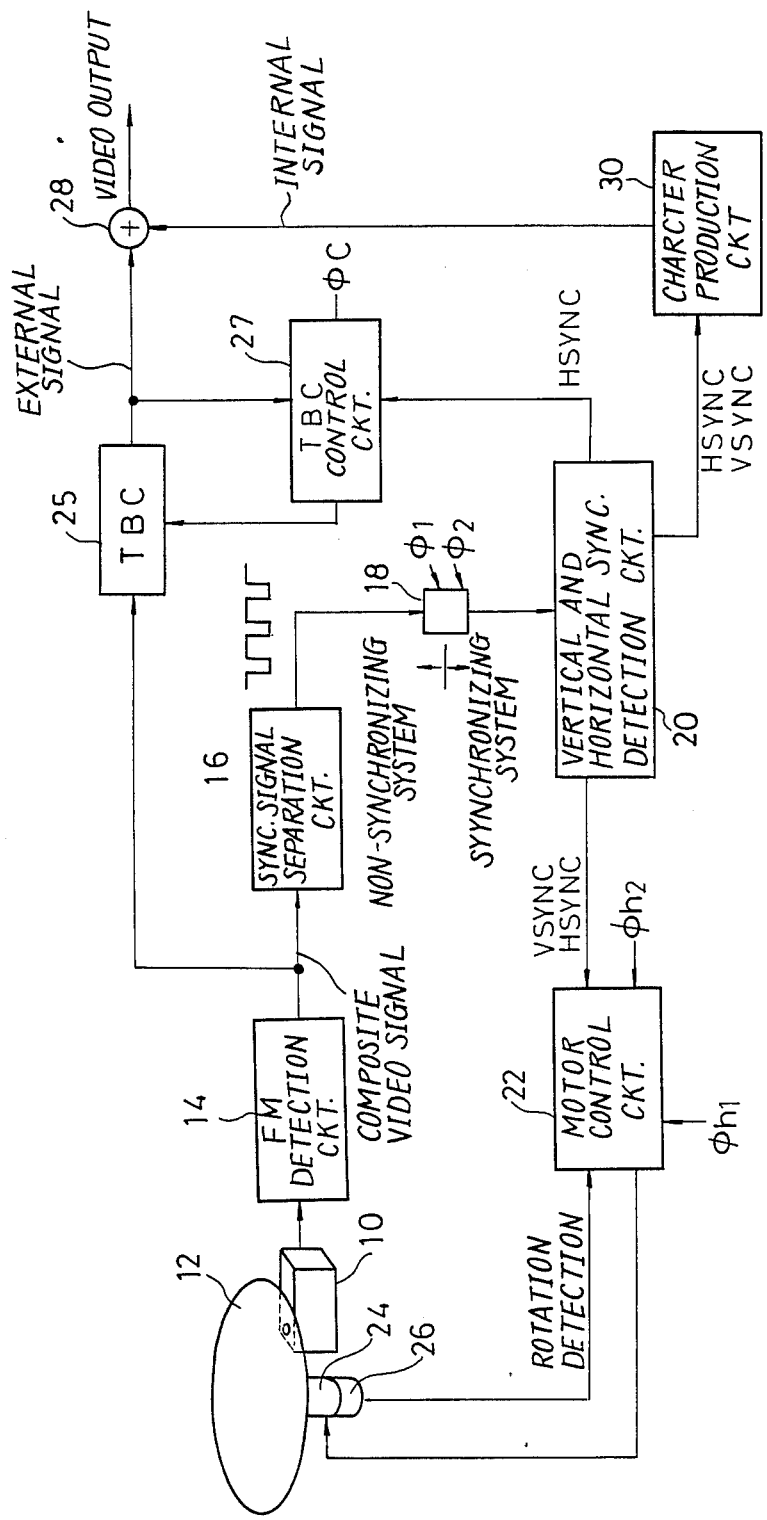
FIG. 2 is a block diagram schematically showing a structure in which a superimpose function is provided to a conventional, video disc playback device.
Figure 3:
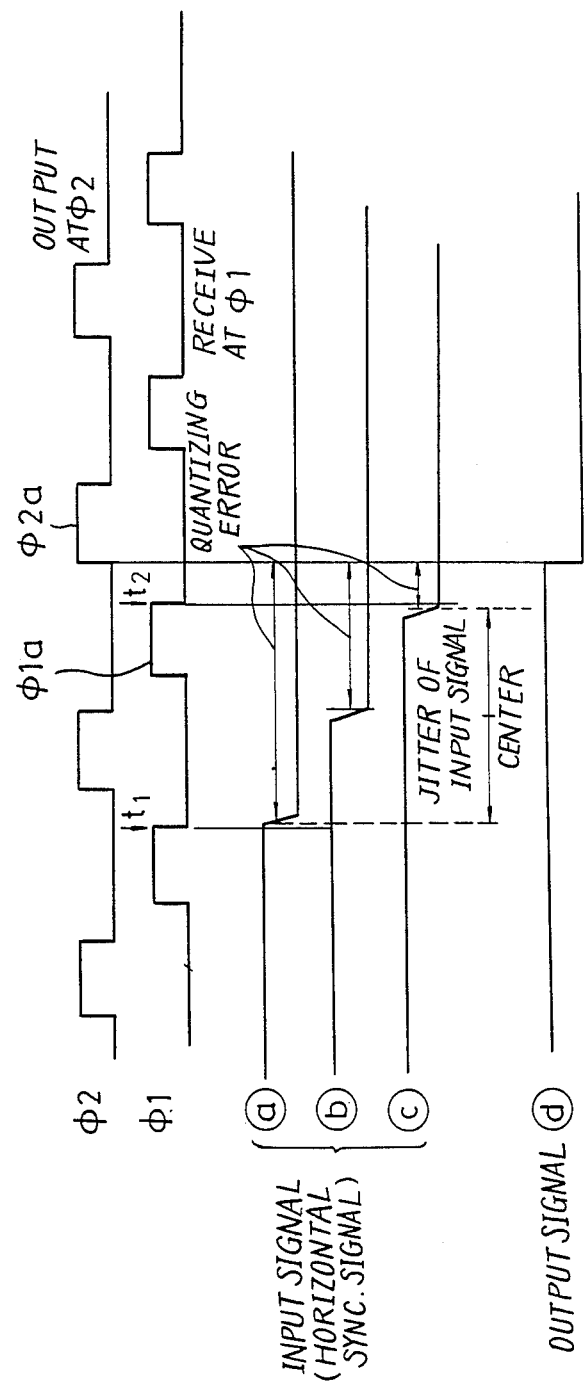

An embodiment of the present invention is shown in FIG. 1. This figure shows a part of the display timing control circuit 76 shown in FIG. 7 and an output count of an HGN counter is used as a signal indicating the position of the internal signal on one scanning line.

Figure 4:
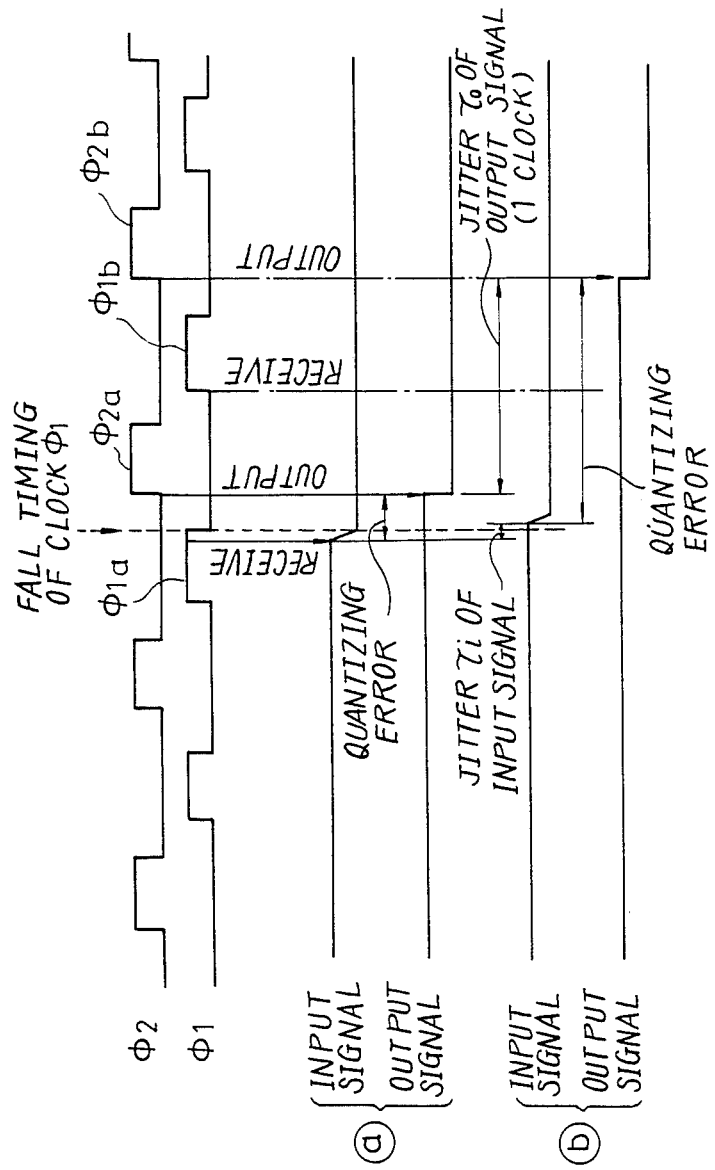
Figure 5:
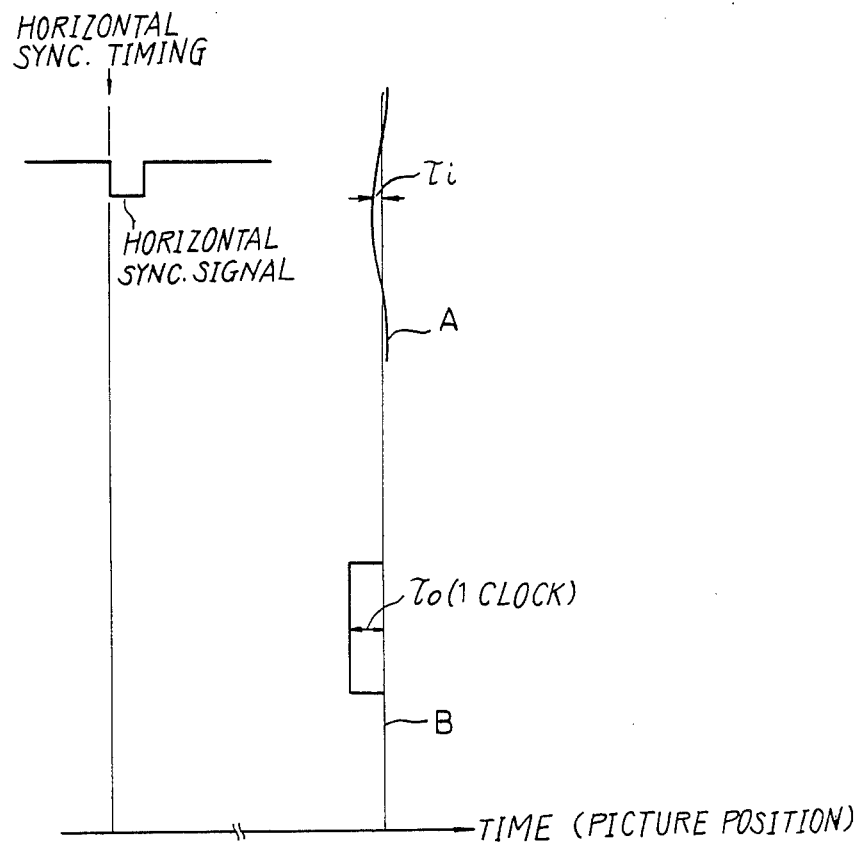
FIG. 5 is a diagram showing a state in which jitter is amplified on a television picture on account of the amplifying operation shown in FIG. 4.
Figure 6:
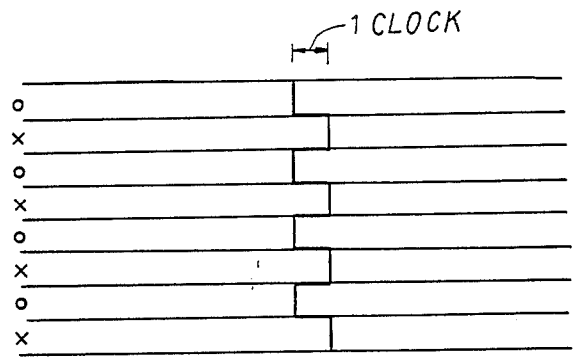
FIG. 6 is a diagram showing a state in which jitter due to eccentricity of the disc is amplified on a television picture on account of the amplifying operation shown in FIG. 4.

In this embodiment, the following controls are performed: (a) Rounding of the external horizontal synchronizing signal EXHSY An expected timing of the external horizontal synchronizing signal of the non-synchronizing system is set in an HGN counter 86 of the synchronizing system which counts 455 in a normal one horizontal scanning period, a window of total $2n+1$ clocks including $\pm n$ clocks at the expected timing of the external horizontal synchronizing signal is established and, when the external horizontal synchronizing signal EXHSY has entered the window, this expected timing (i.e., the center of the window) is treated as the timing of the horizontal synchronization in the synchronizing system even if the entering signal EXHSY is deviated from the center of the window (rounding operation). By this arrangement, if small jitter $\tau_i$ in the non-synchronizing system has been amplified by one clock due to the quantizing error (FIG. 4), the period of the horizontal synchronizing signal in the synchronizing system does not become 454 clocks or 456 clocks but remains to be the standard period of 455 clocks. Accordingly, absolute time from a preceding scanning line in the synchronizing system is fixed at the standard time of 455 clocks and, if response of the television to the horizontal synchronizing signal is not sharp (i.e., if trigger is applied uniformly), a vertical straight line of the internal signal during the superimpose operation is displayed as a straight line on the television whereas, if response of the television is sharp, there occurs shifting of the vertical line only by the actual jitter $\tau_i$ (since the clock is synchronized with the horizontal synchronizing signal, $\tau_i$ appears directly) so that folding of the vertical straight line by one clock as shown in B in FIG. 5 or FIG. 6 can be prevented.

As for the value n which determines the width of the window, 1 (i.e., window width being 3 clocks) or 2 (i.e., window width being 5 clocks) are examples of suitable values.

Figures 8, 9:
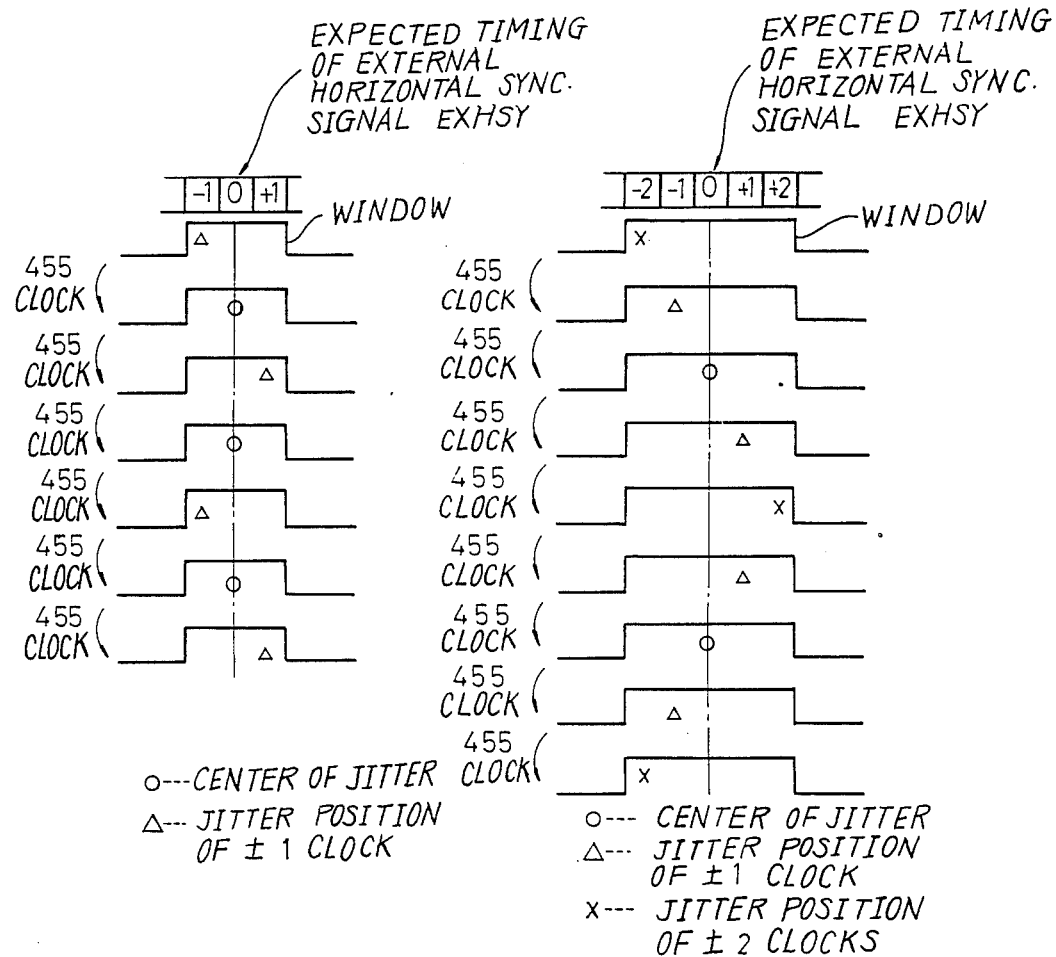
Figure 10:
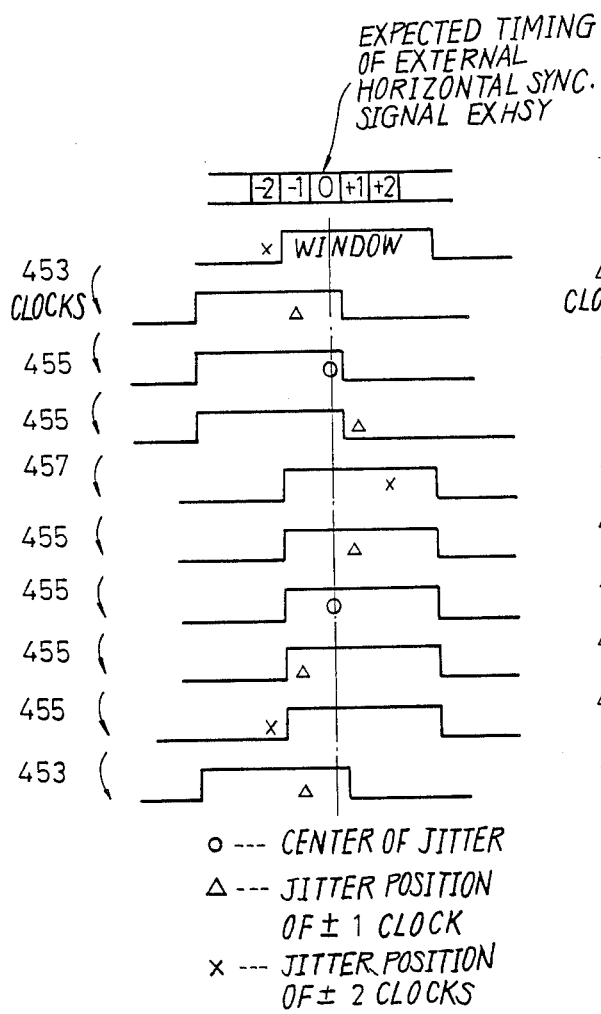
FIG. 10 is a diagram showing an example of window modifying operation.
Figure 11:
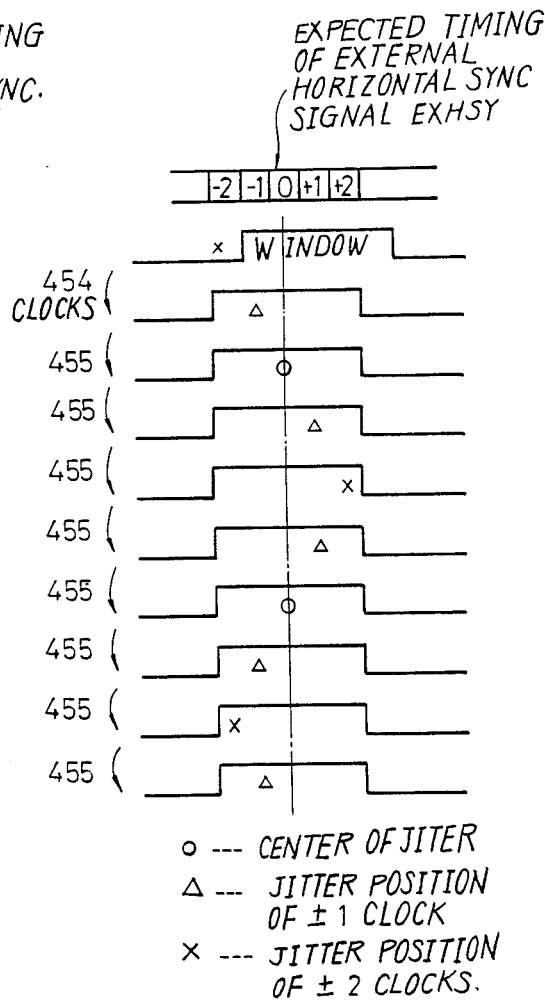
FIG. 11 is a diagram showing an example of this window modifying operation employed in the embodiment of FIG. 1.

FIG. 8 shows a state in which jitter (which has been amplified by quantizing) has occurred within a window with n being 1. FIG. 9 shows a state in which jitter has occurred within a window with n being 2. The wider the window, the wider is the range in which jitter can be absorbed though an excessively wide window is not desirable. In the embodiment of FIG. 1, n is selected to be 2. (b) Correction of the window If the external horizontal synchronizing signal EXHSY has occurred outside of the window, the window may be corrected. For correcting the window, it is conceivable to correct the window, when the external horizontal synchronizing signal EXHSY has occurred outside of the window, in such a manner that a next timing of the external horizontal synchronizing signal EXHSY which has occurred outside of the window will come at the center of the window. This method however is disadvantageous in that the synchronizing system is corrected to a large extent even when the external horizontal synchronizing signal has occurred adjacently outside of the window as described previously with a result that the distortion on the television becomes conspicuous and that it becomes difficult to bring jitter to the center of the window. In the present embodiment, therefore, the correction of the window is effected by shifting the window by a predetermined amount in the direction in which the external horizontal synchronizing signal has occurred outside as shown in FIG. 11 (one clock shifting in FIG. 11). If the external horizontal synchronizing signal has occurred further outwardly of the window, the window is corrected so that a timing of a next external horizontal synchronizing signal EXHSY will come at the center of the window.

Figure 12:
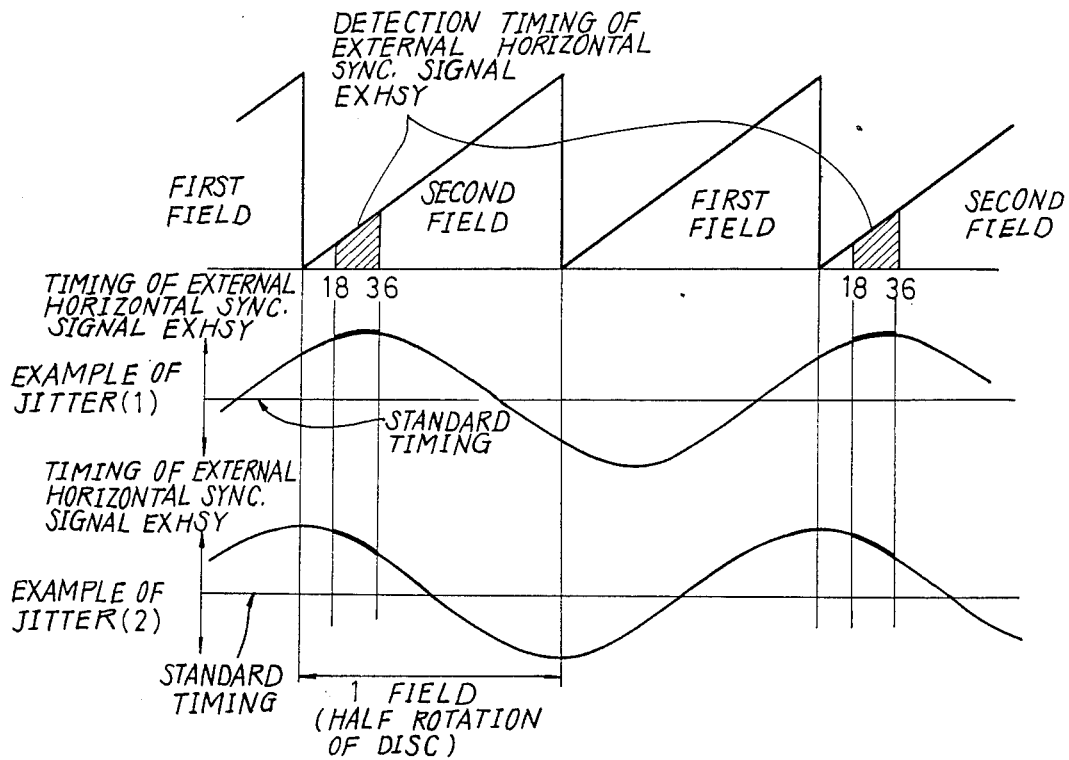
FIG. 12 is a diagram showing limited detection timing of an external horizontal synchronizing signal EXHSY in the circuit of FIG. 1.

By this arrangement, it becomes possible to bring jitter to the center of the window. Further, even when jitter has exceeded marginal value of absorption (i.e., the width of the window), the amount of change in the period of the horizontal synchronizing signal in the synchronizing system is small and such change is smoothly made so that the distortion on the television is inconspicuous. (c) Restriction in detection timing of the external horizontal synchronizing signal EXHSY The timing of detection of the external horizontal synchronizing signal EXHSY is restricted to a specific phase portion of two-field one frame as shown in FIG. 12 (e.g., scanning timing of 18 through 36 in the second field). Main component of jitter is remaining jitter component of TBC due to wow and flutter in the disc rotation so its period is two fields for one rotation of the disc. Accordingly, if the timing of detection of the external horizontal synchronizing signal EXHSY is restricted to a specific phase portion in the two-field one frame, result of detection becomes a value of substantially the same tendency as shown in FIG. 12 and its width of variation becomes small.

According to this arrangement, when detection of the external horizontal synchronizing signal EXHSY is not made, synchronization is performed in the synchronizing system by self-running of the internal counter (i.e., the HGN counter of FIG. 1). In a stable rotation state of the disc, detection of the external horizontal synchronizing signal EXHSY is made only for the purpose of knowing that there is not much discrepancy between the external horizontal synchronization and the internal horizontal synchronization and such partial detection as described above will sufficiently serve for this purpose. (d) Correction during a still picture or trick play When a still picture or trick play is performed, a track-kick to a preceding or succeeding adjacent track is made in response to a kick pulse (one track kick). Since the color burst signal in the adjacent track is shifted in phase by 180 degrees, the main TBC 32 or the color burst TBC 36 (FIG. 7) must be controlled either to advance or delay the phase of the non-synchronizing system by 180 degrees each time one track-kick is made so that the color of the reproduced video signal from the disc is to stay unchanged. The phase amount of 180 degrees in the color burst signal corresponds to one clock of a master clock MCK of 7.16 MHz (455 clocks in one horizontal scanning period H). Further, even if the phase in the non-synchronizing system is shifted, the color in a superimposed picture will be inverted each time the track-kick is made due to failure of following-up of the synchronizing system caused by the above described rounding operation by the window. In the embodiment of FIG. 1, therefore, the count of a timing control counter (HGN counter 86) in the synchronizing system is corrected each time the track-kick is made. More specifically, the period for clearing the HGN counter 86 is increased or decreased from the standard 455 clocks by one clock corresponding to the phase of 180 degrees, i.e., to 456 clocks or 454 clocks.

By performing the above described controls (a) through (d), the position and color of the picture of the internal signal during superimpose can be stabilized in the synchronizing system also.

Description will now be made about the circuit shown in FIG. 1. (1) A self-running loop performing rounding by the window as described in (a) above The HGN counter 86 counts up the master clock MCK of 7.16 MHz (455 clocks in one horizontal scanning period). The HGN counter 86 is normally cleared each time its count has reached 454 (the 455-th count counting from the cleared state), i.e., normal one horizontal scanning period. In this embodiment, a window including this standard clearing timing and with a width of ±2 clocks centering the standard timing (i.e., width of counts 452 through 456 corresponding to 5 clocks) is established as the above described window.

The HGN counter 86 produces a pulse at the 450-th count. This pulse signal is successively shifted in a shift register 92 which is driven by clocks $\phi_1$ and $\phi_2$ (two phase clocks having the same period as the master clock MCK) through an AND gate 90. An output of the 453-rd count of the shift register 92 is delayed by a register 96 through an AND gate 94 by one clock and clears the HGN counter 86 through a NOR gate 98 when the count of the HGN counter 86 is the standard timing of 454. This is the self-running loop according to the standard timing used in the rounding operation when the external horizontal synchronizing signal EXHSY has occurred in the window as described in (a) above. This self-running loop is used also in a section other than the timing of detecting the external horizontal synchronizing signal EXHSY as described in (c) above. (2) Portion concerning the window correction operation of (b) above.

The horizontal synchronizing signal provided from the horizontal synchronizing detection circuit 74 is delayed by 2 clocks by a shift register 102 through an AND gate 100 and thereby constitutes the external horizontal synchronizing signal EXHSY. If a count 451 output of the shift register 92 becomes "1" (i.e., timing one clock before the window) at a timing at which this external horizontal synchronizing signal EXHSY is produced, this causes an AND gate 104 to be switched on and the signal EXHSY is delayed by 2 clocks by a shift register 106 and clears the HGN counter 86 through an OR gate 108, an AND gate 110, an OR gate 112 and the NOR gate 98 at a timing of count 453 of the HGN counter 86. In other words, when the external horizontal synchronizing signal EXHSY has occurred at a timing of count 451 which is one clock before the window, a next window is shifted one clock before by clearing the HGN counter 86 at a timing one clock before the standard timing. This is the window correcting operation performed when the external horizontal synchronizing signal EXHSY has been obtained one clock before the window as described in (b) above.

At this time, a count 453 output (output for the self-running loop) becomes "1" at the 453-rd count of the HGN counter 86 and this output "1" is applied to an AND gate 94. Since at the 453-rd count of the HGN counter 86, an output "0" of the NOR gate 98 is applied to the HGN counter 86 and also to the AND gate 94, the AND gate 94 is switched off and the clearing of the HGN counter 86 by the self-running loop is prohibited.

When the count 455 output of the shift register 92 has become "1" at a timing at which the horizontal synchronizing signal is produced from the horizontal synchronizing signal detection circuit 74 (i.e., 2 clocks before the horizontal synchronizing signal EXHSY produced from the shift register 102)(i.e., a timing one clock after the window relative to the timing of the horizontal synchronizing signal EXHSY), an AND gate 114 is switched on and the HGN counter 86 is cleared through the AND gate 110, the OR gates 108, 112 and the NOR gate 98. In other words, when it is expected that a next external horizontal synchronizing signal EXHSY will occur at a timing of count 457 which is one clock after the window, the next window is shifted after by one clock by clearing the HGN counter 86 at a timing one clock later than the standard timing. This is the window correcting operation performed when the external horizontal synchronizing signal EXHSY has been obtained one clock after the window as described in (b) above.

At this time, in the shift register 92, the count 453 output becomes "1" 2 clocks before the count 455 output becomes "1" and this signal is delayed by one clock by the register 96 and clears the HGN counter 86 at a timing of the count 454. Since, however, the HGN counter 86 is cleared again at the timing of the count 455, by the above described operation, the clearing at the timing of count 454 is ignored and, accordingly, no problem arises.

If the external horizontal synchronizing signal EXHSY has occurred when counts 451 through 457 of the shift register 92 are all "0" (i.e., a timing which is not included either in the window or in the adjacent ±1 clock) and the output of the NOR gate 116 is "1", an AND gate 117 is switched on and the HGN counter 86 is cleared through the OR gate 108, AND gate 110, OR gate 112 and NOR gate 98. In other words, a next window is determined on the basis of the timing of the external horizontal synchronizing signal EXHSY. This is the window correcting operation performed when the external horizontal synchronizing signal EXHSY has occurred widely outside of the window.

When the external horizontal synchronizing signal EXHSY has occurred at a timing before count 450 of the HGN counter 86, the HGN counter 86 is cleared before the count 450 output is produced so that the self-running loop described in (a) above is not operated.

When the external horizontal synchronizing signal EXHSY has occurred at a timing of the 450 count of the HGN counter 86, a count 450 output is provided by the HGN counter 86. Since, however, the AND gate 90 is switched off by a signal derived by inverting a signal EXHSYNC obtained from the external horizontal synchronizing signal EXHSY by an inverter 180, the count 450 output is not transmitted to the shift register 92 so that the self-running loop is not operated. (3) Portion concerning restriction of timing of detection of the external horizontal synchronizing signal EXHSY described in (c) above An AND gate 110 is enabled only at a timing of a predetermined period of the second field (e.g., the eighteenth to thirty-sixth scanning) and, accordingly, the HGN counter 86 is not cleared at other time even if the external horizontal synchronizing signal EXHSY has occurred. This is the operation for restricting the timing of detection of the external horizontal synchronizing signal EXHSY described in (c) above. At this time, the HGN counter performs self-running with the standard timing (counts 0 through 454) by the self-running loop. (4) Portion concerning the correction during the track-kick described in (d) above A rise detection circuit 118 detects a rise portion of a track-kick command each time the track-kick command has been issued. A CBPCH register 120 in a reset state is set by an output signal of the rise detection circuit 118 applied through an AND gate 122 and an OR gate 124 and is self-held through an AND gate 126. Upon receiving a next track-kick with the CBPCH register 120 in a set state, an AND gate 126 is turned off through an inverter 128. At this time, the AND gate 122 is disabled through an inverter 130 so that the CBPCH register 120 is reset. In this manner, the CBPCH register 120 produces "1" and "0" alternately at each track-kick command.

The output of the CBPCH register 120 is applied to the color TBC control circuit 40 of FIG. 7. When the output of the CBPCH register 120 is "1", the color TBC control circuit 40 adds a voltage equivalent to one advancing the phase of the reproduced signal from the disc by 180 degrees of the color burst to the control voltage of the color TBC 36 thereby shortening the delay time of the color TBC 36.

When the output of the CBPCH register 120 is "0", the color TBC control circuit 40 subtracts voltage equivalent to one for delaying the phase of the reproduced signal from the disc by 180 degrees of the color burst from the control voltage of the color TBC 36 thereby prolonging the delay time of the color TBC 36. In this manner, the time base correction of the non-synchronizing system is performed at each track-kick.

The time base correction of the non-synchronizing system may be performed also by the main TBC 32.

The output of the CBPCH register 120 is transmitted to a shift register 132. When the CBPCH register 120 becomes in a set state, first and second bit outputs of the shift register 132 become a combination of "1" and "0" and the first bit output is inverted to "0" by an inverter 134 so that a NOR gate 136 is switched on and rising of the output of the CBPCH register 120 thereby is detected. When the CBPCH 120 becomes a reset state, the first and second bit outputs of the shift register 132 have become a combination of "1" and "0" and an AND gate 138 is switched on and falling of the CBPCH register 120 thereby is detected.

Upon detection of rising of the output of the CBPCH register 120, a CB. register 144 is set through an AND gate 140 and an OR gate 142 and is self-held through an AND gate 146. Upon setting of the CB. register 144, an AND gate 148 is turned on at a timing at which count 453 of the shift register 92 is "1" and the HGN counter 86 is cleared through an OR gate 150, an AND gate 152, the OR gate 112 and the NOR gate 98. In other words, the HGN counter 86 is cleared at a timing one clock before count 454 which is the standard timing so that the synchronizing system is advanced by 180 degrees. Simultaneously with clearing of the HGN counter 86, the CBT. register 144 is cleared by a signal derived by inverting the count 453 output of the shift register 92 by an inverter 154.

Upon detection of falling of the output of the CBPCH register 120, a CB- register 164 is set through an AND gate 160 and an OR gate 162 and is self-held through an AND gate 166. Upon setting of the CB- register 164, an AND gate 168 is turned on at a timing at which the count 455 output of the shift register 92 is "1" and the HGN counter 86 is cleared through the OR gate 150, OR gate 152, OR gate 112 and NOR gate 98. In other words, the HGN counter 86 is cleared one clock after the 454 count which is the standard timing so that the synchronizing system is delayed by 180 degrees. Simultaneously with clearing of the HGN counter 86, the CB- register 164 is cleared by a signal derived by inverting the 455 count output of the shift register 92 by an inverter 172.

In the foregoing manner, the time base reference of the synchronizing system is changed at each track-kick. When the track-kick is performed, the output of the NOR gate 174 becomes "0" and the AND gate 110 is turned off so that the HGN counter 86 is no longer cleared by the external horizontal synchronizing signal EXHSY.

The above operations are performed only when a superimpose command EXDSP has been issued. Otherwise the superimpose command EXDSP is zero and the AND gates 100 and 152 are turned off so that these operations are not performed except for the control of the color TBC 36 during the track-kick.

The embodiment of FIG. 1 operates in such a manner that discrepancy between the external synchronization and the internal synchronization is corrected even in the case the external horizontal synchronizing signal EXHSY is largely deviated from the internal synchronization. If, however, a signal which is not largely deviated from the internal synchronization only is used as the external horizontal synchronizing signal EXHSY, the burden of the correcting operation by the circuit of FIG. 1 is reduced.

Figure 13:
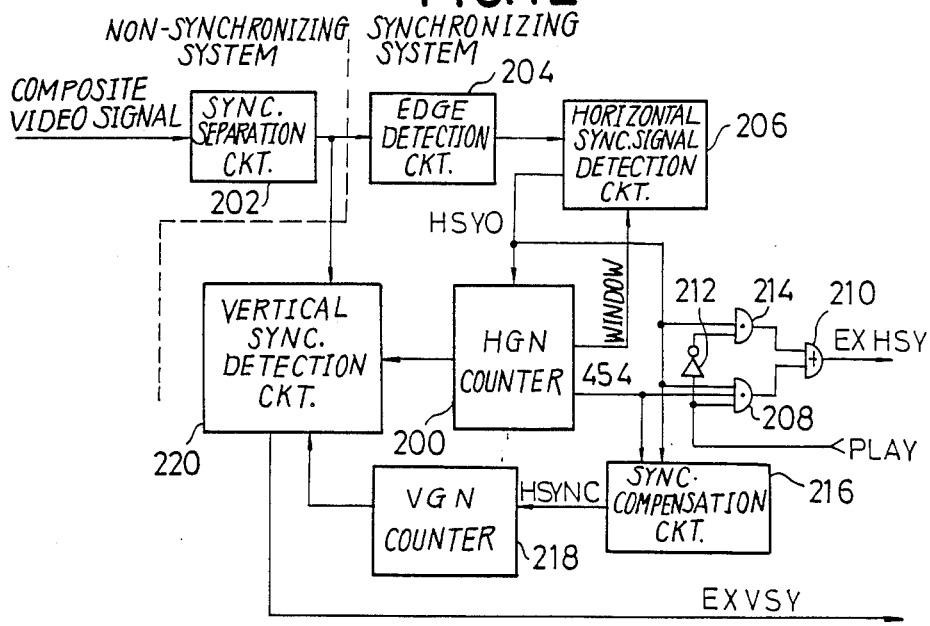
FIG. 13 is a block diagram showing an example of a circuit for producing the external horizontal synchronizing signal EXHSY.
Figure 14:
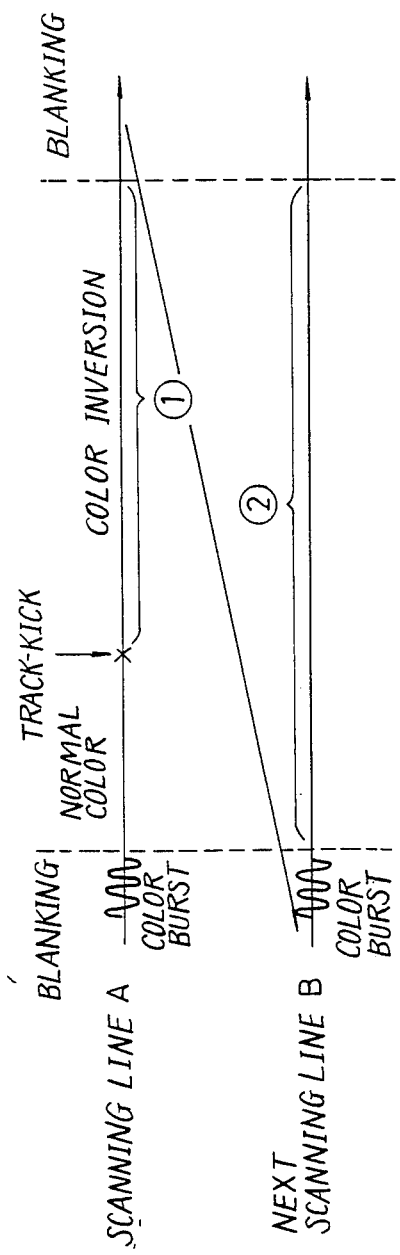
FIG. 14; is a diagram for explaining inversion of the color in the reproduced signal from the disc occurring at the track-kick.

FIG. 13 shows an example of a circuit in which the external horizontal synchronizing signal EXHSY is derived only when the standard timing (i.e., timing of count 454) of an internal counter (HGN counter) 200 has coincided with an external assumed horizontal synchronizing signal HSYO. In FIG. 13, a synchronizing signal separation circuit 202 extracts a synchronizing signal from a composite video signal of the non-synchronizing system. An edge detection circuit 204 detects an edge portion of the extracted synchronizing signal and also removes a signal which is apparently deemed to be a noise. A horizontal synchronizing detection circuit 206 establishes a window, detects a horizontal synchronizing signal from the edge detection output and produces the assumed horizontal synchronizing signal HSYO. An HGN counter 200 is cleared by the assumed horizontal synchronizing signal HSYO, driven by a reference clock produced from a crystal oscillator output, counts 455 (0 through 454) in one horizontal scanning period and outputs a signal at count 454.

An AND gate 208 is turned on when the timing of the assumed horizontal synchronizing signal HSYO and the timing of the count 454 output of the HGN counter 200 have coincided with each other and gates out the external horizontal synchronizing signal EXHSY through an OR gate 210. This operation however is performed only in a normal play mode. In a trick play mode, a tolerance of a certain extent is established and the assumed horizontal synchronizing signal occurring within the window is used as the synchronizing signal. That is, an AND gate 214 is enabled through an inverter 212 to provide the assumed horizontal synchronizing signal HSYO as the external horizontal synchronizing signal EXHSY.

A synchronizing signal compensation circuit 216 provides, when the horizontal synchronizing signal has not occurred in the window, the count 454 output of the HGN counter 200 as a substitution signal for the assumed horizontal synchronizing signal HSYO.

A signal HSYNC (the signal HSYO or its substitution signal) provided by the synchronizing signal compensation circuit 216 at each horizontal scanning period is used for counting up of a VGN counter 218. Counts of the VGN counter 218 correspond to scanning line numbers. A vertical synchronizing signal detection circuit 220 establishes a window in accordance with the count of the VGN counter 218 and produces a vertical synchronizing signal EXVSY from the extracted synchronizing signal from the synchronizing signal separation circuit 202.

Another embodiment of the invention will now be described with reference to FIGS. 15 through 17.

In this embodiment, correction of vertical synchronization is made for each field of the internal video signal by reducing scanning lines in each field. Correction of horizontal synchronization is made from each horizontal scanning period 1H of the internal synchronization by shortening the horizontal scanning period. The correction is made in such an order that the correction of the vertical synchronization is made first and, after completion thereof, the correction of the horizontal synchronization is made.

Figure 15:
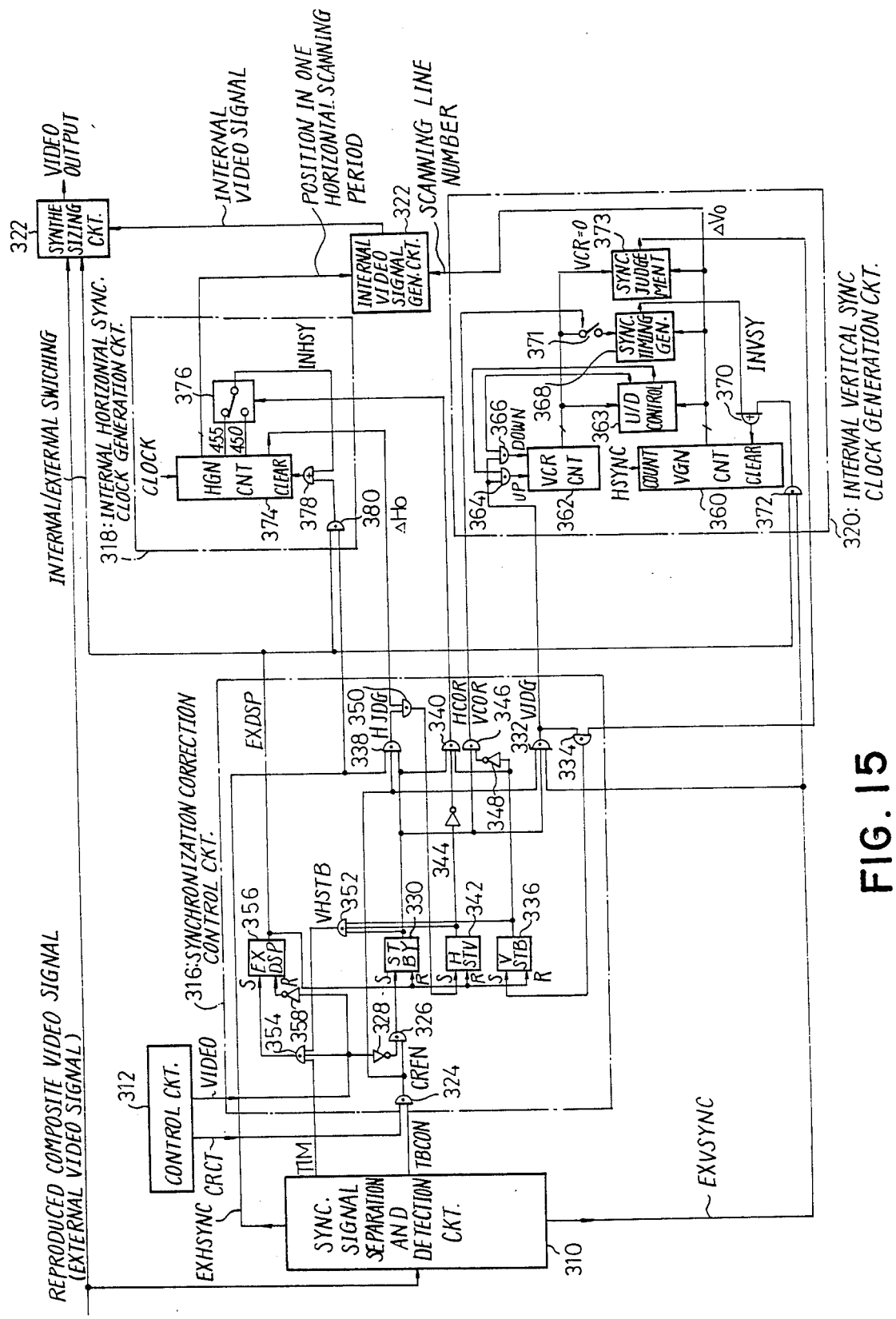
FIG. 15 is a block diagram showing another embodiment of the invention.

In FIG. 15, a disc reproduced composite video signal (an external video signal) is a signal derived by FM demodulating a signal reproduced from a video disc.

A synchronizing signal separation and detection circuit 310 is a circuit for extracting a vertical synchronizing signal EXVSYNC and a horizontal synchronizing signal EXHSYNC from the external video signal.

A control circuit 312 produces a command CRCT indicating correction of synchronization and a command VIDEO indicating a play mode for the external video signal. If a disc playback operation is made in a state in which the internal video signal is being produced, the synchronization correction command CRCT is issued and a synchronization correction operation thereby is started. Upon completion of the synchronization correction operation, the play mode is switched to the one for the external video signal by the disc playback command VIDEO and other signals to be described later.

An internal vertical synchronizing clock generation circuit 320 is a circuit for achieving vertical synchronization of the internal video signal and produces a signal indicating a scanning line number of the internal video signal.

An internal horizontal synchronizing clock generation circuit 318 is a circuit for achieving horizontal synchronization of the internal video signal and produces a signal indicating a position of the internal video signal in one horizontal scanning period 1H.

A synchronization correction control circuit 316 corrects the internal vertical synchronization generated by the internal vertical synchronizing clock generation circuit 320 and the internal horizontal synchronization generated by the internal horizontal synchronizing clock generation circuit 318 in such a manner that the internal synchronization gradually approaches the external synchronization when the play mode is to be switched from the internal video signal to the external video signal or when the internal video signal is to be superimposed upon the external video signal.

A internal video signal generation circuit 322 generates internal video signals used for displaying explanation of functions of the video disc playback device and manner of using the device or for displaying demonstration in a shop. The circuit 322 generates the internal video signals in response to the command indicating the scanning line number from the internal vertical synchronizing clock generation circuit 320 and the command indicating the position in one horizontal scanning period 1H from the internal horizontal synchronizing clock generation circuit 318.

A synthesizing circuit 324 switches the play mode between the internal video signal and the external video signal in response to the command from the synchronization correction control circuit 316 and also superimposes the internal video signal upon the external video signal to produce the synthesized signal. In a case where the play mode of the internal video signal is instructed, the circuit 324 produces the internal video signal and when the play mode has been switched from the internal video signal to the external video signal, the circuit 324 produces the external video signal upon completion of correction of the internal synchronizing signal. A signal which has been selected by the synthesizing circuit 324 is displayed on the television as a video output.

In a case where a play mode in which the internal video signal is to be superimposed on the external video signal is instructed, a signal obtained by adding the internal video signal and the external video signal together is displayed on the television upon completion of synchronization of the internal video signal.

Constructions of the respective circuits 316, 318 and 320 will be described below.

(1) The synchronization correction control circuit 316

In the synchronization correction control circuit 316, an AND gate 324 gates out a correction permission command CREN only when the synchronizing signal separation and detection circuit 310 produces a time base corrector on signal TBCON and the control circuit 312 produces the synchronization correction command CRCT. A time base correction is a control for removing jitter contained in the disc reproduced signal using a successively variable delay circuit or the like device. The time base correction control starts after the disc motor is started and the disc rotation becomes stable and upon starting of the time base correction control, the time base corrector on signal TBCON is produced. Therefore, the correction permission command CREN is provided by the AND gate 324 after the disc rotation has been stabilized.

An AND gate 326 receives the correction permission command CREN from the AND gate 324 and a signal derived by inverting the disc playback command VIDEO from the control circuit 312 by an inverter 328. The disc playback command VIDEO is a command for switching the play mode compulsorily to the external video signal side but it is normally not issued before the synchronization correction is completed so that the output of the inverter 328 is "1" and the correction permission command CREN is applied to a set input of a correction standby register 330 through the AND gate 326 to set this register 330.

An AND gate 346 is turned on when the correction standby register 330 is set and a vertical synchronization standby register 336 is reset (i.e., vertical synchronization is not accomplished) with a result that an output of an inverter 348 is "1" and the AND gate 346 in this state produces a vertical synchronization correction demand signal VCOR. Generation of this signal VCOR initiates the correction operation of the internal vertical synchronization in the internal vertical synchronizing clock generation circuit 320.

An AND gate 332 is turned on at a timing of an external vertical synchronizing signal EXVSYNC when the correction permission command CREN is produced and the correction standby register 330 is set and produces a vertical synchronization discriminating signal VJDG. This signal VJDG is applied to the internal vertical synchronizing clock generation circuit 320 and used therein for detecting a synchronizing error between the internal vertical synchronization and the external vertical synchronization.

An AND gate 334 is enabled upon receiving a synchronization judgment signal $\Delta V_0$ which is produced when there is coincidence between the internal vertical synchronization and the external vertical synchronization in the internal vertical synchronizing clock generation circuit 320 and is turned on at a timing of the vertical synchronization discriminating signal VJDG, thereby setting the vertical synchronization standby register 336. By setting of the vertical synchronization standby register 336, the coincidence of vertical synchronization is confirmed.

An AND gate 340 is turned on when the vertical synchronization standby register 336 is set in a state in which the correction standby register 330 is set and the horizontal synchronization standby register 342 is reset (horizontal synchronization has not been accomplished) with a result that an output of an inverter 344 is "1" and the ANA gate 340 in this state produces a horizontal correction demand signal HCOR and thereupon the operation for correcting the internal horizontal synchronization is started in the internal horizontal synchronizing clock generation circuit 318.

An AND gate 338 is turned on at a timing of generation of the external horizontal synchronizing signal EXHSYNC in a state in which the correction permission command CREN has been issued and the correction standby register 330 is set and thereby produces the horizontal synchronization discriminating signal HJDG. This signal HJDG is used for detecting a synchronization error between the internal horizontal synchronization and the external horizontal synchronization.

An AND gate 350 is enabled by a horizontal synchronization coincidence detection signal H which is produced when there is coincidence between the internal horizontal synchronization and the external horizontal synchronization and is turned on at a timing of the horizontal synchronization discriminating signal HJDG to set a horizontal synchronization standby register 342. By setting of the horizontal synchronization standby register 342, the coincidence of the horizontal synchronization is confirmed.

An AND gate 352 is turned on when all of the correction standby register 330, the vertical synchronization standby register 336 and the horizontal synchronization standby register 342 are set and the coincidence between the internal and external vertical synchronizations and that between the internal and external horizontal synchronizations have thereby been confirmed, and produces a vertical and horizontal synchronization standby signal VHSTB.

An AND gate 354 is turned on at a timing of generation of a field finish timing signal TIM by the synchronizing signal separation and detection circuit 310 when the vertical and horizontal standby signal VHSTB is produced and the disc playback command VIDEO is produced by the control circuit 312 and thereby sets an external display register 356.

Upon setting of the external display register 356, an external display signal EXDSP is produced and the output of the synthesizing circuit 324 is switched from the internal video signal to the external video signal or a composite signal of these two signals is provided as a superimpose output from the synthesizing circuit 324. Simultaneously, the correction standby register 330, the vertical synchronization standby register 336 and the horizontal synchronization standby register 342 are reset. Upon generation of the external display signal EXDSP by setting of the external display register 356, the internal vertical synchronizing clock generation circuit 320 and the internal horizontal synchronizing clock generation circuit 318 which have so far performed self-running independently from each other have their internal counters cleared respectively by the external vertical synchronizing signal EXVSYNC and the external horizontal synchronizing signal EXHSYNC. After switching to the external video signal synchronization state, therefore, the internal video signal and the external video signal are always synchronized with each other so that synthesis of the two signals, i.e., the superimpose function, can be realized in a stable state. Further, when playback of a disc has finished, the disc playback command VIDEO has fallen and the external display register 356 has been reset through an inverter 358 thereby to switch the play mode from the external video signal to the internal video signal, or the superimpose function is released, the change can be made smoothly without performing the synchronization correction.

The field finish timing signal TIM which sets the external display register 356 is produced at a timing of a rear portion of 262 or 263 scanning for each field. By switching of the play mode by this signal TIM from the external video signal to the internal video signal or superimpose, disturbance in the vertical synchronization or unnatural switching of the picture can be prevented.

(2) The internal vertical synchronizing clock generation circuit 320

In the internal vertical synchronizing clock generation circuit 320, a VGN counter 360 performs internal synchronization. The counter 360 counts up the horizontal synchronizing clock HSYNC produced at a period of a normal 1H on the basis of a crystal oscillation output and produces a count corresponding to the scanning line number. That is, the counter 360 self-runs alternately from count 0 to count 262 (the first field, i.e., corresponding to the first to the 263-rd scanning lines) and from count 0 to count 261 (the second field, i.e., corresponding to the 264-th to the 525-th scanning lines). The synchronization correction for performing superimpose or for switching the play mode from the internal character signal to the external video signal is effected in the internal synchronization by gradually shortening interval of timing for clearing the VGN counter 360 (i.e., by gradually shortening the period of one field by gradually reducing the number of the scanning lines). The number of reduced scanning lines is determined within a range in which the television can follow such reduction (excessive reduction of the scanning lines in one field causes disturbance in the picture displayed on the television). If the error between the internal vertical synchronization and the external vertical synchronization is large, the number of reduced scanning lines is increased. The number of reduced scanning lines is decreased with decrease in such error and is decreased to zero when the error has entered a minimum range (i.e., an allowable range in which disturbance in the picture does not occur in switching of the play mode from the internal video signal to the external video signal). By changing the number of reduced scanning lines in this manner, correction of vertical synchronization can be made promptly and accurately.

A VCR counter 362 determines the number of reduced scanning lines. The larger the count, the larger is the number of reduced scanning lines. The smaller the count, the smaller is the number of reduced scanning lines and when the count is zero, the number of reduced scanning lines is zero.

An up/down control circuit 363 performs up/down control of the VCR counter 362. The error between the internal vertical synchronization and the external vertical synchronization can be detected by the count of the VGN counter 360 which represents the timing of the internal vertical synchronization existing at a timing of production of the vertical synchronization discriminating signal VJDG which represents the external vertical synchronization. If the count of the VCR counter 362 is small while the synchronizing error is large, the AND gate 364 is turned on at a timing of the vertical synchronization discriminating signal VJDG to cause the VCR counter 362 to perform upcounting. If the count of the VCR counter 362 is large while the synchronizing error is small, the AND gate 366 is turned on at a timing of the vertical synchronization discriminating signal VJDG to cause the VCR counter 362 to perform downcounting. In the foregoing manner, the VCR counter 362 performs upcounting or downcounting in accordance with the amount of error between the internal vertical synchronization and the external vertical synchronization and a proper number of reduced scanning lines according to the amount of error is determined.

A synchronizing timing generation circuit 368 produces a clear signal INVSY at a timing that the VGN counter 360 counts the number of reduced scanning lines designated by the VCR counter 362 and thereby clears the VGN counter 360 via an OR gate 370. Since the VGN counter 360 is cleared before it reaches count 262 (the first field) or count 261 (the second field), timing for returning to zero is advanced with a resulting curtailment in the scanning lines.

When the vertical synchronization correction command VCOR has not been issued, the switch 371 is turned off and the clear signal INVSY therefore ceases to be produced so that the VGN counter 360 circulates with the normal counts (i.e., 0–262 in the first field and 0–261 in the second field).

A synchronization judgment circuit 373 produces the synchronization judgment signal $\Delta V_0$ when the count of the VCR counter 362 is zero (i.e., there is no reduction in the scanning lines) and the error between the external vertical synchronization and the internal vertical synchronization is at the minimum (i.e., in the range which can be absorbed by the television).

An AND gate 372 is turned on in a state in which the correction of the internal vertical synchronization and the internal horizontal synchronization is completed, the external display register 356 is set and the external display signal EXDSP is produced, and then applies the external vertical synchronizing signal EXVSYNC to the VGN counter 360 through the OR gate 370 to reset the VGN counter 360. In other words, after starting of superimpose or switching of the play mode to the external video signal upon completion of the correction of synchronization, the internal vertical synchronization is caused to match with the external synchronization in each field so as to coincide with the latter.

The count of the VGN counter 360 is applied to the internal character signal generation circuit 322 as a signal representing the scanning line number of the internal video signal and used therein for producing a video signal of the corresponding scanning line.

(3) The internal horizontal synchronizing clock generation circuit 318

In the internal horizontal synchronizing clock generation circuit 318, an HGN counter 374 performs internal horizontal synchronization. The counter 374 counts 455 in a normal one horizontal scanning period 1H in response to a crystal oscillated clock and produces a count corresponding to a horizontal position in one scanning line. In the play mode of the internal video signal, the counter 374 performs self-running. The correction of synchronization performed when superimpose is to be performed or the play mode is to be switched from the internal video signal to the external video signal is effected by gradually quickening a timing for clearing this HGN counter 374 within a range in which the television can follow thereby gradually shortening the length of one horizontal scanning period 1H. As described before, in the correction of vertical synchronization, the amount of reduction of the scanning lines in the period of one field is made variable. In the correction of horizontal synchronization, the amount of reduction in one horizontal scanning period 1H is made uniform. The switching of one horizontal scanning period 1H is made by a switch 376. When the correction of synchronization is not performed, the switch 376 is connected to a contact a and the counter HGN counter 374 is cleared through an OR gate 378 at each 455 count corresponding to the normal one horizontal scanning period 1H. When the correction of synchronization is performed, the switch 376 is connected to a contact b by the horizontal synchronization command HCOR and the counter 374 is cleared at each 450 count. Accordingly, the horizontal scanning period H of the internal horizontal synchronization is shortened by 5 counts at each scanning whereby the internal horizontal synchronization gradually approaches the external horizontal synchronization. When the error between the internal horizontal synchronization and the external horizontal synchronization is reduced to an amount which falls within the range which can be absorbed by the television, the synchronization judgment signal ΔH₀ is produced.

The amount of correction in one scanning for the internal horizontal synchronization is made 5 counts uniformly for the reason that the horizontal synchronization, as different from the vertical synchronization, can follow a coarser signal owing to the construction of a television.

An AND gate 380 is turned on when the external display register 356 is set and the external display signal EXDSP is produced upon completion of the correction of the internal vertical synchronization and the internal horizontal synchronization and applies the external horizontal synchronization signal EXHSYNC to the HGN counter 374 through the OR gate 378 to reset it. In other words, after superimpose is started or the play mode is switched to the external video signal after completion of the correction of synchronization, the internal synchronization is caused to match the external horizontal synchronization at each scanning so as to coincide with the external horizontal synchronization.

The operation of the circuit of FIG. 15 will now be described.

Since the external display signal EXDSP is not produced before the disc playback operation is started, the internal vertical synchronizing clock generation circuit 320 and the internal horizontal synchronizing clock generation circuit 318 perform self-running to produce the internal video signal from the internal video signal generation circuit 322 which is displayed on the television through the synthesizing circuit 324.

When the disc playback command or the superimpose command has been issued, the synchronization correction command CRCT is produced by the control circuit 312. As the disc rotation has been stabilized and the time base corrector on signal TBCON is produced, the AND gate 324 is turned on and the correction standby register 330 is set through the AND gate 326. The AND gate 346 thereby is turned on and the vertical synchronization correction demand signal VCOR is produced to turn on the switch 371 of the internal vertical synchronizing clock generation circuit 320 and thereby start the operation for correcting the internal vertical synchronization.

The operation for correcting the vertical synchronization is performed in such a manner that the error between the external vertical synchronization and the internal vertical synchronization is detected by the count of the VGN counter 360 at the timing of the vertical synchronization judgment signal VJDG representing the external vertical synchronization and, if the error is large, the VCR counter 362 is caused to count up whereas if the error is small, the YCR counter 362 is caused to count down. The number of reduced scanning lines in one field is determined by the count of the VCR counter 362 (the larger the count, the larger is the number of reduced scanning lines). The synchronizing timing generation circuit 368 resets the VGN counter 360 at an interval in which the period of one field is shortened by reduction of the scanning lines and the internal vertical synchronization gradually approaches the external vertical synchronization. When the error between the internal vertical synchronization and the external vertical synchronization is large, the number of reduced scanning lines is large and as the error becomes smaller, the number is decreased until it becomes zero at the count 0 of the VCR counter 362.

Upon reduction of the error to substantially zero at the count 0 of the VCR counter 362, the synchronization judgment signal ΔV₀ is produced which causes the vertical synchronization standby register 336 to be set through the AND gate 334 at a timing of the vertical synchronization discriminating signal VJDG. The vertical synchronization correction demand signal VCOR thereupon rises and the switch 371 is turned off to finish the vertical synchronization correction.

Upon setting of the vertical synchronization standby register 336, the AND gate 340 is turned on and the horizontal synchronization demand signal HCOR is produced to perform the operation for correcting the horizontal synchronization. More specifically, the switch 376 is connected to the contact b in the internal horizontal synchronizing clock generation circuit 318 whereby the HGN counter 374 is reset at count 450 instead of count 455 corresponding to the normal one horizontal scanning period 1H.

One horizontal scanning period 1H in the internal horizontal synchronization is curtailed and the internal horizontal synchronization gradually approaches the external horizontal synchronization. Since the amount of curtailment is small, the synchronization is locked in an ordinary television. When the internal horizontal synchronization has substantially coincide with the external horizontal synchronization, the synchronization judgment signal ΔH₀ is produced.

Upon generation of the synchronization judgment signal ΔH₀, the AND gate 350 is turned on at a timing of the horizontal synchronization discriminating signal HJDG corresponding to the external horizontal synchronization to set the horizontal synchronization standby register 342. This causes the horizontal synchronization correction demand signal HCOR to rise and thereby return the switch 376 to the contact a which is the normal side to finish the horizontal synchronization correction.

Upon completion of correction of the vertical synchronization and the horizontal synchronization, the AND gate 352 is turned on and the disc playback command VIDEO is produced by the control circuit 312. This causes the AND gate 354 to be turned on by the signal TIM representing the timing of the end of the field, the external display register 356 to be set and the external display signal EXDSP to be produced. The signal generated from the synthesizing circuit 324 thereby is switched from the internal video signal to the external video signal or the synthesizing circuit 324 produces a composite signal in which the internal video signal is superimposed on the external video signal and a picture from the disc is displayed on the television. At this time, the registers 330, 336 and 342 are reset.

Upon generation of the external display signal EXDSP, the AND gates 372 and 380 are enabled and the internal vertical synchronization and the internal horizontal synchronization are synchronized by the external vertical synchronizing signal EXVSYNC and the external horizontal synchronizing signal EXHSYNC. Accordingly, the internal synchronization substantially coincides with the external synchronization during playback of the disc and a stable superimpose is ensured. In switching the play mode from the external video signal to the internal video signal after completion of playback of the disc, a smooth switching also is achieved without correction.

Figure 16:
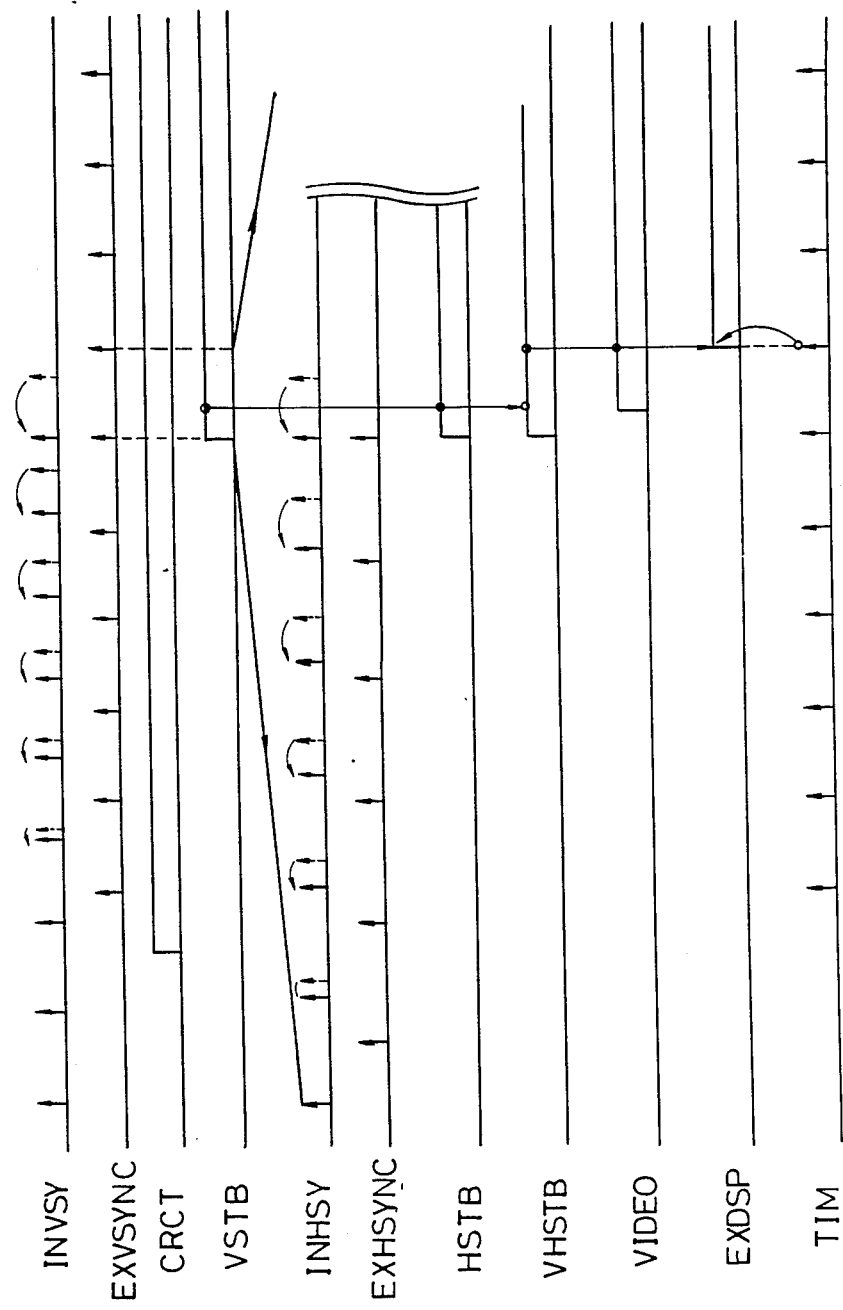
FIG. 16 is a time chart showing the operation for correcting the internal synchronizing signal by the circuit of FIG. 15.

FIG. 16 is a time chart showing the above described correction operation.

Upon generation of the synchronization correction command CRCT, the vertical synchronization correction operation is started and the interval of the internal vertical synchronizing signal INVSY is shortened to gradually approach the external vertical synchronizing signal EXVSY. When the two signals have coincided with each other, the vertical synchronizing standby signal VSTB rises whereby the vertical synchronization correction operation is completed and the horizontal synchronization correction operation is uninterruptedly started. In the horizontal synchronization correction operation, the interval of the internal horizontal synchronizing signal INHSY is shortened to gradually approach the external horizontal synchronizing signal EXHSY. When the two signals have coincided with each other, the horizontal synchronizing standby signal HSTB rises and the horizontal synchronization correction operation is completed. The synchronization correction operations have all been completed now and the external display signal EXDSP rises. The play mode is switched from the internal video signal to the external video signal or the superimpose operation is started so that a picture from the disc or a composite picture of a picture from the disc and an internal character is displayed on the television.

Figure 17:
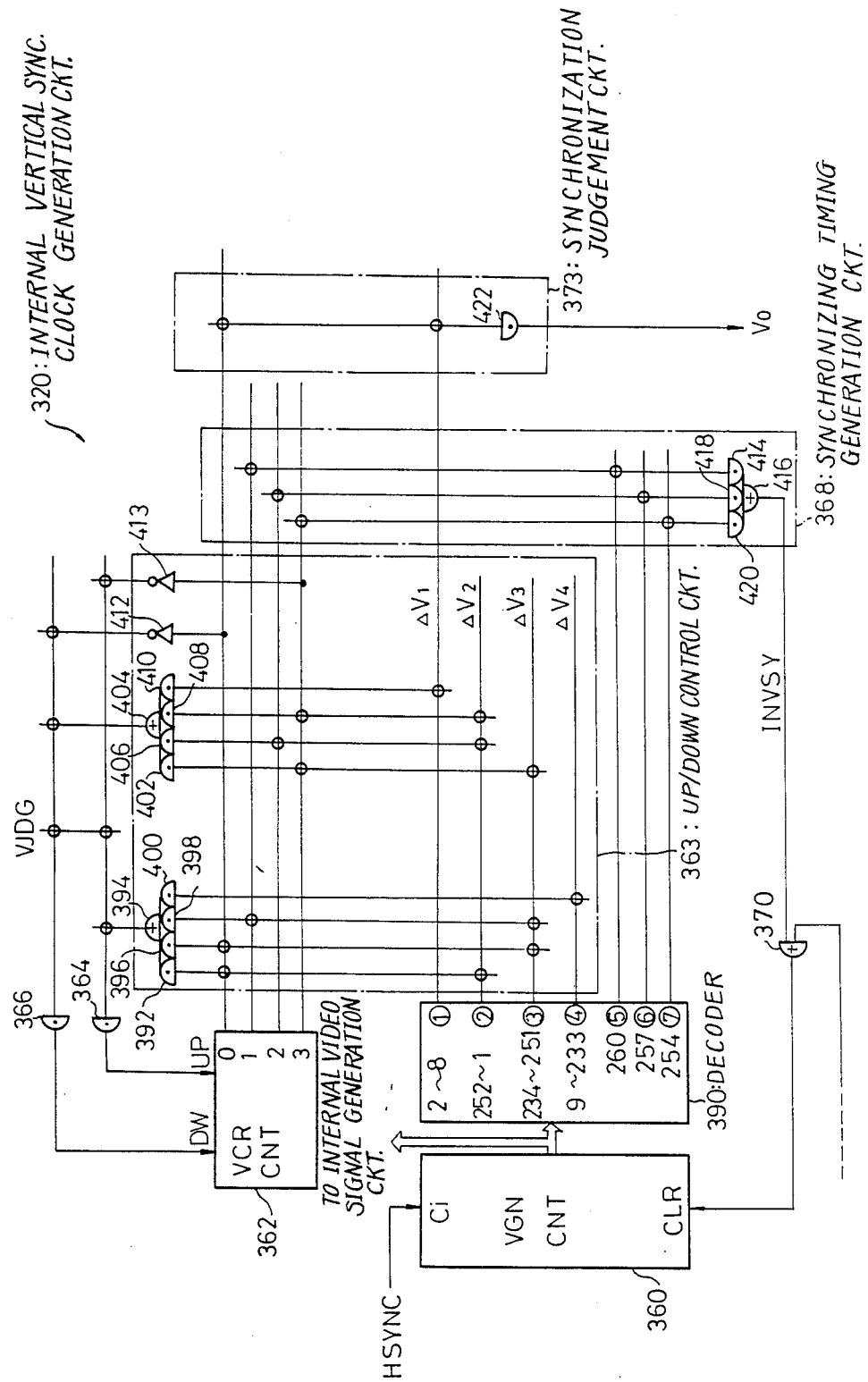
FIG. 17 is a circuit diagram showing a specific example of an internal vertical synchronizing clock generation circuit 320 of FIG. 15.

A specific example of the internal vertical synchronizing clock generation circuit 320 is shown in FIG. 17.

A VGN counter 360 counts up a clock HSYNC corresponding to the horizontal synchronizing signal and produced from a crystal oscillator output. During reproduction of the internal video signal, the counter 360 counts 0 through 262 (the first field) and 0 through 261 (the second field) alternately thereby producing signals representing the scanning line numbers (in this example, count 5 is used as corresponding to the first scanning line for synchronizing timing with other circuits) which are supplied to an internal video signal generation circuit 322.

A decoder 390 decodes a count of the VGN counter 360. Among outputs of the decoder 390, outputs ① through ④ are used for detecting an error between the external vertical synchronization and the internal vertical synchronization and outputs ⑤ through ⑦ are used for clearing the VGN counter 360 at an interval shorter than the normal one field period.

More specifically, the output ① represents a section of counts 2 through 8 which is the nearest section to the count 5 constituting the reference timing of the external vertical synchronization (i.e., an amount of error $\Delta V_1$). If the vertical synchronization discriminating signal VJDG occurs in this section, it is judged that the internal vertical synchronization has substantially coincided with the external vertical synchronization.

The output ② represents a section of counts 252 through 261 (or 262), 0 and 1. If the vertical synchronization discriminating signal VJDG has occurred in this section, it is judged that the internal vertical synchronization and the external vertical synchronization are apart from each other by a greater distance than in the case of the output ① (an error amount $\Delta V_2$.

The output ③ represents a section of counts 234 through 251. If the vertical synchronization discriminating signal VJDG has occurred in this section, it is judged that the internal vertical synchronization and the external vertical synchronization are apart from each other by a greater distance ,than in the case of the output ② (an error amount $\Delta V_3$).

The output ④ represents a section of counts 9–233. If the vertical synchronization discriminating signal VJDG has occurred in this section, it is judged that the internal vertical synchronization and the external vertical synchronization are apart from each other by the greatest distance (an error amount $V_4$).

The magnitude of the error amounts $\Delta V_1$ through $\Delta V_4$ is expressed in terms of the unidirectional correction operation to be described below and does not necessarily agree with the magnitude of the numerical value.

The output ⑤ represents count 260. If the VGN counter 360 is reset at this count, one field finishes one or two counts more early than at the count 261 or 262 which constitutes the normal interval. This count is used when the VCR counter 362 is 1, i.e., the internal vertical synchronization is near the external vertical synchronization.

The output ⑥ represents count 257. If the VGN counter 360 is reset at this count, one field finishes four or five counts more early than at the count 261 or 262 which constitutes the normal interval. This count is used when the VCR counter 362 is 2, i.e., the internal vertical, synchronization and the external vertical synchronization are slightly apart from each other or is used in a transient state.

The output ⑦ count 254. If the VGN counter 360 is reset at this count, one field finishes seven or eight counts more early than at the count 261 or 262 constituting the normal interval. This count is used when the VCR counter 362 is 3, i.e., the internal vertical synchronization and the external vertical synchronization are widely apart from each other.

The VCR counter 362 performs upcounting and downcounting 0 through 3. The count of this counter 362 corresponds to the amount of shortening of the interval of one field of the internal vertical synchronization. Count 0 corresponds to an amount of shortening 0 (i.e., the VGN counter 360 is reset at the normal count 261 or 262), count 1 corresponds to an amount of shortening 1 or 2 (i.e., the VGN counter 360 is reset at count 260), count 2 corresponds to an amount of shortening 4 or 5 (i.e., the VGN counter 360 is reset at count 257) and count 3 corresponds to an amount of shortening 7 or 8 (i.e., the VGN counter 360 is reset at count 254).

An up/down control circuit 363 controls the VCR counter 362 to perform upcounting or downcounting so that the amount of shortening of one field satisfies the above described relations in accordance with the error between the external vertical synchronization and the internal vertical synchronization. Conditions of upcounting and downcounting by the up/down control circuit 363 are shown in the following table:

TABLE

| count of VCR counter 62 | Amount of error between external vertical synchronization and internal vertical synchronization | | | |
|---|---|---|---|---|
| | $\Delta V_1$ | $\Delta V_2$ | $\Delta V_3$ | $\Delta V_4$ |
| 0 | no change | ↓ | ↓ | ↓ |
| 1 | ↑ | no change | ↓ | ↓ |
| 2 | ↑ | ↑ | no change | ↓ |
| 3 | ↑ | ↑ | ↑ | no change |

↑: 1 count down
↓: 1 count up

In the up/down control circuit 363, an AND gate 392 is turned on at a timing of the output ② the VGN counter 360 when the VCR counter 362 is 0 (in the logic circuit shown in FIG. 17, encircled points among crossing signal lines represent signal lines on which signals are being applied). A signal produced by the AND gate 392 is delivered out through an OR gate 394 and, if the vertical synchronization discriminating signal VJDG is produced at this time, causes the VCR counter 362 to count up by one count through an AND gate 364. Similarly, AND gates 396, 398 and 400 count up by one count under the condition shown in the above table.

An AND gate 402 is turned on at a timing of the output ③ the VGN counter 360 when the count of the VCR counter 362 is 3. The output of the AND gate 402 is delivered out through an OR gate 404 and, if the vertical synchronization discriminating circuit VJDG is produced at this time, causes the VCR counter 362 to be count down by one count through an AND gate 366. Similarly, AND gates 406, 408 and 410 count down by one count under the conditions shown in the above table.

In the foregoing manner, the relation between the amount of error and the VCR counter 362 becomes
$\Delta V_1$:0
$\Delta V_2$:1
$\Delta V_3$:2
$\Delta V_4$:3
and the VCR counter 362 thereby is stabilized.

An inverter 412 prohibits downcounting when the VCR counter 362 has counted down to 0 and an inverter 413 prohibits upcounting when the VCR counter 362 has counted up to 3.

In the synchronizing timing generation circuit 368, an AND gate 414 is turned on at a timing of count 260 of the VGN counter 360 when the count of the VCR counter 362 is 1 and gates out the internal vertical synchronizing signal INVSY through an OR gate 416 thereby resetting the VGN counter 360. Similarly, an AND gate 418 is turned on at a timing of count 257 of the VGN counter 360 when the count of the VCR counter 362 is 2 and an AND gate 420 is turned on at a timing of count 254 of the VGN counter 360 when the count of the VCR counter 362 is 3 respectively gating out the internal vertical synchronizing signal INVSY through an OR gate 416 to reset the VGN counter 360.

In the synchronization judgment circuit 373, an AND gate 422 is turned on at a timing of counts 2 through 8 of the VGN counter 360 when the count of the VCR counter 362 is 0 and provides the synchronization judgment signal $\Delta V_0$. By generation of this signal $\Delta V_0$, substantial coincidence between the internal vertical synchronization and the external vertical synchronization is confirmed.

What is claimed is:

1. A video disc playback device comprising:
   a first processing system for reproducing and processing a video signal recorded on a disc;
   a second processing system for processing and superimposing an internal video signal on the video signal reproduced from the disc;
   timing window establishing means for establishing a timing window including an expected timing of a synchronizing signal of said first processing system;
   detection means for detecting the occurrence of said synchronizing signal in said window; and
   control means for controlling said second processing system to synchronize with said expected timing if the synchronizing signal of said first processing system has occurred in said window.

2. A device as defined in claim 1 further comprising:
   correction means for correcting said timing window when the synchronizing signal of said first processing system has occurred outside of said timing window within a predetermined length of time so that said timing window is shifted in a direction to include the timing of the synchronizing signal.

3. A device as defined in claim 2 further comprising:
   time base correcting means for correcting time base of the reproduced video signal of said first processing system each time a track-kick is performed; and
   time base reference changing means for compulsorily changing a time base reference of said second processing system each time said track-kick is performed.

4. A device as defined in claim 3 wherein said time base correcting means comprises:
   means for either advancing or delaying the entire reproduced video signal by a phase of 180 degrees of color burst for each track-kick.

5. A device as defined in claim 3 wherein said time base reference changing means comprises:
   means for either advancing or delaying said time base reference by a phase of 180 degrees of color burst for each track-kick.

* * * * *